(12) United States Patent
Siomina et al.

(10) Patent No.: US 12,446,070 B2
(45) Date of Patent: Oct. 14, 2025

(54) SYSTEMS AND METHODS FOR UE OPERATION IN PRESENCE OF CCA

(71) Applicant: Telefonaktiebolaget LM Ericsson (publ), Stockholm (SE)

(72) Inventors: Iana Siomina, Täby (SE); Muhammad Ali Kazmi, Sundbyberg (SE); Santhan Thangarasa, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 794 days.

(21) Appl. No.: 17/634,468

(22) PCT Filed: Aug. 14, 2020

(86) PCT No.: PCT/EP2020/072902
§ 371 (c)(1),
(2) Date: Feb. 10, 2022

(87) PCT Pub. No.: WO2021/032641
PCT Pub. Date: Feb. 25, 2021

(65) Prior Publication Data
US 2022/0330339 A1 Oct. 13, 2022

Related U.S. Application Data

(60) Provisional application No. 62/887,935, filed on Aug. 16, 2019.

(51) Int. Cl.
*H04W 36/00* (2009.01)
*H04W 36/08* (2009.01)
(Continued)

(52) U.S. Cl.
CPC ....... *H04W 74/0816* (2013.01); *H04W 36/08* (2013.01); *H04W 36/249* (2023.05);
(Continued)

(58) Field of Classification Search
None
See application file for complete search history.

(56) References Cited

U.S. PATENT DOCUMENTS

2012/0309404 A1* 12/2012 Suzuki ............. H04W 56/0045
455/450
2018/0270644 A1* 9/2018 Koorapaty ............ H04W 8/005
(Continued)

OTHER PUBLICATIONS

ETSI TS 138 133 V15.5.0 (Jul. 2019).*
(Continued)

*Primary Examiner* — Abdelillah Elmejjarmi
(74) *Attorney, Agent, or Firm* — Weisberg I.P. Law, P.A.

(57) ABSTRACT

Systems and methods for User Equipment (UE) operation in presence of Clear Channel Assessment (CCA) are provided. In some embodiments, a method performed by a wireless device for cell selection accounting for requirements includes: determining a measurement period in a serving cell for the cell selection or cell re-selection (T1), wherein the measurement period is determined based on a number of consecutive Discontinuous Reception (DRX) cycles; determining a number of measurement occasions configured with a Discovery Reference Signal (DRS) in the serving cell during T1; determining availability of the DRS at the measurement occasions; and performing measurement based on availability of the DRS at the measurement occasions during T1. In this way, a wireless device may operate in NR RRC_IDLE/RRC_INACTIVE in the presence of CCA, e.g., Listen-Before-Talk (LBT).

27 Claims, 12 Drawing Sheets

(51) Int. Cl.
　　*H04W 36/24*　　(2009.01)
　　*H04W 74/08*　　(2009.01)
　　*H04W 74/0816*　(2024.01)
　　*H04W 76/20*　　(2018.01)
　　*H04W 36/14*　　(2009.01)

(52) U.S. Cl.
　　CPC ....... *H04W 74/0866* (2013.01); *H04W 76/20* (2018.02); *H04W 36/1446* (2023.05)

(56) References Cited

U.S. PATENT DOCUMENTS

| | | | |
|---|---|---|---|
| 2019/0132760 A1 | 5/2019 | Siomina et al. | |
| 2019/0313324 A1* | 10/2019 | Dalsgaard | H04W 24/10 |
| 2020/0389847 A1* | 12/2020 | Deng | H04W 52/0219 |
| 2022/0174608 A1* | 6/2022 | Laselva | H04W 24/08 |
| 2022/0232471 A1* | 7/2022 | Laselva | H04W 24/10 |

OTHER PUBLICATIONS

ETSI TS 138 304 V15.3.0 (May 2019).*
3GPP TSG-RAN WG2 Meeting #101,R2-1802126.*
International Search Report and Written Opinion of the International Searching Authority for PCT International Application No. PCT/EP2020/072902 dated Oct. 14, 2020.
Panasonic, "Cell Reselection Procedure for NR-U," R2-1900583, 3GPP TSG-RAN WG2 Meeting #105, Athens, Greece, Feb. 25-Mar. 1, 2019, 2 pages.
Kyocera, "MDT considerations for NG-RAN," R2-1906657, 3GPP TSG-RAN WG2 #106, Reno, USA May 13-17, 2019, 4 pages.
3GPP TS 38.133 V16.0.0, "3rd Generation Partnership Project; Technical Specification Group Radio Access Network; NR; Requirements for support of radio resource management (Release 16)," Jun. 2019, pp. 17-186.
Notice of Reasons for Rejection, including English translation, for Japanese Patent Application No. 2022-509587 dated Mar. 7, 2023 (17 pages).
Ericsson, "Discussions on cell re-selection requirements for NR-U standalone," R4-1909482, 3GPP TSG-RAN WG4 Meeting #92, Ljubljana, Slovenia, Aug. 26-30, 2019, 5 pages.
Qualcomm Incorporated, "On Cell Reselection Requirements for NR-U," R4-1908476, 3GPP TSG-RAN WG4 Meeting #92, Ljubljana, Slovenia, Aug. 26-30, 2019, 6 pages.

* cited by examiner

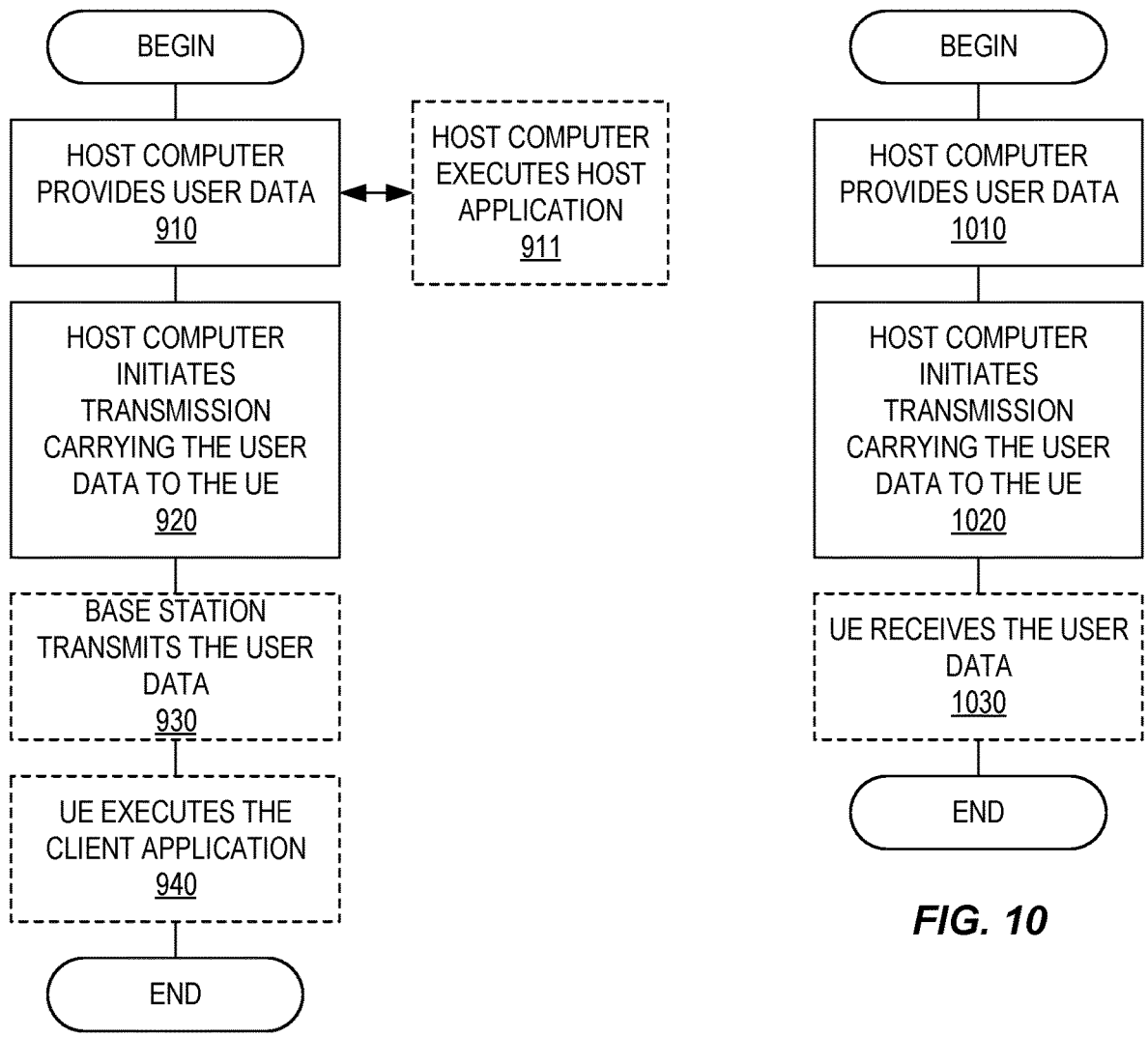

SYSTEMS AND METHODS FOR UE OPERATION IN PRESENCE OF CCA

RELATED APPLICATIONS

This application is a 35 U.S.C. § 371 national stage application of PCT International Application No. PCT/EP2020/072902 filed Aug. 14, 2020, which claims the benefit of U.S. provisional patent application Ser. No. 62/887,935, filed Aug. 16, 2019, the disclosures and content of which are incorporated by reference herein in their entireties.

TECHNICAL FIELD

The present disclosure relates to operating in presence of Clear Channel Assessment (CCA), e.g., Listen-Before-Talk (LBT).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

New Radio Unlicensed (NR-U) or NR in unlicensed spectrum. Some parts of the spectrum have become potentially available for license-assisted access to unlicensed operation. This spectrum can be used by operators to augment their service offerings in licensed bands by being operated under a license-exempt regime or Industrial Scientific Medical but must be shared with existing mobile services and other incumbent services. During the NR-U study Item in the $3^{rd}$ Generation Partnership Project (3GPP), different unlicensed bands or shared bands have been further discussed, such as 2.4 GHz band, 3.5 GHz band, 5 GHz band, and 6 GHz band.

For the channel access mechanism, a Long Term Evolution License Assisted Access (LTE-LAA) Listen-Before-Talk (LBT) mechanism is adopted as the baseline for the 5 GHz band and adopted as the starting point of the design for 6 GHz band. At least for a band where absence of Wi-Fi cannot be guaranteed (e.g., by regulation), LBT can be performed in units of 20 MHz.

During LBT, the transmitting node determines whether there are no other transmissions (by performing certain measurements and comparing to a threshold). Therefore, it starts COT (Channel Occupancy Time, wherein the transmitting node occupies the channel) which does not exceed MCOT (maximum COT, which can vary by regions/systems/etc.), otherwise it halts transmissions for a certain time and may retry again later. However, unlike in LTE, there are more LBT categories in NR and for some categories (Cat2), there are also 16 μs Cat2 and 25 μs Cat2 LBT types, depending on the switching time between Uplink (UL) and Downlink (DL) (16 μs Cat2 means the switching longer than 16 but shorter than 25, and 25 μs Cat2 means 25 or longer). In addition, there is also a concept of UE transmission based on LBT procedure during Base Station (BS)-initiated COT (shared COT), during which a UE may be allowed to transmit, without performing LBT, during a COT which was initiated by a base station.

Similar to LTE, NR-U is expected to have DRS (discovery signals) or similar, e.g., to enable initial access and measurements. LTE DRS contains only PSS/SSS/CRS (Primary Synchronisation Signal/Secondary Synchronisation Signal/Channel Reference Signal), but NR DRS may comprise more signals/channels.

Channel access schemes: FIG. 1 shows LTE, LBT, and COT, where "s" is the sensing time period. In this figure, if the channel is determined to be busy, after some deferral time, the UE may try again to sense on the channel in order to determine whether the channel is available, and if so after some deterministic backoff time the UE may start transmitting the UL burst (during the UE's channel occupancy time) but for no longer than the maximum channel occupancy time (MCOT) which can be e.g., up to 10 ms, depending on the region.

FIG. 1 illustrates LTE LBT procedure and COT. The channel access schemes for NR-based access for unlicensed spectrum can be classified into the following categories:

Category 1 (Cat 1): Immediate transmission after a short switching gap;
Category 2 (Cat 2): LBT without random back-off—similar to LTE;
Category 3 (Cat 3): LBT with random back-off with a contention window of fixed size;
Category 4 (Cat 4): LBT with random back-off with a contention window of variable size.

For different transmissions in a COT and different channels/signals to be transmitted, different categories of channel access schemes (a.k.a. LBT categories) can be used.

UE Operation in RRC_IDLE and RRC_INACTIVE modes without LBT. In NR, a new Radio Resource Control (RRC) state RRC_INACTIVE was introduced where a UE remains in CM-CONNECTED (UE and network can communicate at the NAS layer level) and can move within an area configured by Next Generation NG-Radio Access Network (RAN) (the RNA) without notifying NG-RAN. In RRC_INACTIVE, the last serving gNB node keeps the UE context and the UE-associated NG connection with the serving Authentication Management Function (AMF) and User Plane Function (UPF). Currently, UE RRM requirements for RRC_IDLE are also applicable for RRC_INACTIVE.

In RRC_IDLE and RRC_INACTIVE, the UE may perform serving cell evaluation, cell selection, and cell reselection including detection and measurements.

An example of UE requirements for intra-frequency cell reselection requirements are given in Table 1.

TABLE 1

Intra-frequency cell reselection requirements in NR without LBT

| DRX cycle length [s] | Scaling Factor (N1) FR1 | Scaling Factor (N1) FR2 Note1 | $T_{detect\_NR\_Intra}$ [s] (number of DRX cycles) | $T_{measure\_NR\_Intra}$ [s] (number of DRX cycles) | $T_{evaluate\_NR\_Intra}$ [s] (number of DRX cycles) |
|---|---|---|---|---|---|
| 0.32 | 1 | 8 | 11.52 × N1 × M2 (36 × N1 × M2) | 1.28 × N1 × M2 (4 × N1 × M2) | 5.12 × N1 × M2 (16 × N1 × M2) |
| 0.64 |   | 5 | 17.92 × N1 (28 × N1) | 1.28 × N1 (2 × N1) | 5.12 × N1 (8 × N1) |
| 1.28 |   | 4 | 32 × N1 (25 × N1) | 1.28 × N1 (1 × N1) | 6.4 × N1 (5 × N1) |
| 2.56 |   | 3 | 58.88 × N1 (23 × N1) | 2.56 × N1 (1 × N1) | 7.68 × N1 (3 × N1) |

Note 1:
Applies for UE supporting power class 2&3&4. For UE supporting power class 1, N1 = 8 for all DRX cycle length.
Note 2:
M2 = 1.5 if SMTC periodicity of measured intra-frequency cell >20 ms; otherwise M2 = 1.

With cell selection, the UE searches for a suitable cell (based on cell selection criteria) of the selected Public Land Mobile Network (PLMN), chooses that cell to provide available services, and monitors its control channel. This procedure is defined as "camping on the cell." The UE shall, if necessary, then register its presence, by means of a Non-Access Stratum (NAS) registration procedure, in the tracking area of the chosen cell. As an outcome of a successful Location Registration, the selected PLMN then becomes the registered PLMN.

If the UE finds a more suitable cell, according to the cell reselection criteria, it reselects onto that cell and camps on it. If the new cell does not belong to at least one tracking area to which the UE is registered, location registration is performed. In RRC_INACTIVE state, if the new cell does not belong to the configured RNA, an RNA update procedure is performed.

Some purposes of camping on a cell in RRC_IDLE state and RRC_INACTIVE state are:
a) It enables the UE to receive system information from the PLMN.
b) When registered and if the UE wishes to establish an RRC connection or resume a suspended RRC connection, it can do this by initially accessing the network on the control channel of the cell on which it is camped.
c) If the network needs to send a message or deliver data to the registered UE, it knows (in most cases) the set of tracking areas (in RRC_IDLE state) or RNA (in RRC_INACTIVE state) in which the UE is camped. It can then send a "paging" message for the UE on the control channels of all the cells in the corresponding set of areas. The UE will then receive the paging message and can respond.
d) It enables the UE to receive Earthquake and Tsunami Warning System and Communication Mobile Alert System notifications.

When camped normally, the UE typically performs some or all of the following tasks:
monitor the paging channel of the cell as specified in clause 7 according to information broadcast in System Information Block 1 (SIB1);
monitor Short Messages transmitted with Paging Radio Network Temporary Identifier (P-RNTI) over DCI as specified in clause 6.5 in 3GPP TS 38.331;
monitor relevant System Information as specified in 3GPP TS 38.331;
perform necessary measurements for the cell reselection evaluation procedure;
execute the cell reselection evaluation process on the following occasions/triggers:
1) UE internal triggers, so as to meet performance as specified in TS 38.133;
2) When information on the Broadcast Control Channel used for the cell reselection evaluation procedure has been modified.

In the camped on any cell (only applicable for RRC_IDLE), the UE shall perform the following tasks:
same tasks as for the camped normally state (see above), except for paging monitoring,
regularly attempt to find a suitable cell trying all frequencies of all Radio Access Technologies (RATs) that are supported by the UE. If a suitable cell is found, UE shall move to camped normally state,
if the UE supports voice services and the current cell does not support IMS emergency calls as indicated by the field ims-EmergencySupport in SIB1 as specified in TS 38.331 [3], the UE shall perform cell selection/reselection to an acceptable cell that supports emergency calls in any supported RAT regardless of priorities provided in system information from current cell, if no suitable cell is found.

There currently exist certain challenges. In LTE, only Secondary Cells (SCells) can be configured in unlicensed spectrum, hence, no LBT-based procedures exist in LTE. In NR, standalone NR-U operation is yet to be fully configured, which means that UE will have to deal with LBT failures even in RRC_IDLE. Improved systems and methods for UE operation in presence of Clear Channel Assessment (CCA) are needed.

SUMMARY

Systems and methods for User Equipment (UE) operation in the presence of Clear Channel Assessment (CCA) are provided. In some embodiments, a method performed by a wireless device for cell selection accounting for requirements includes: determining a measurement period in a serving cell for the cell selection or cell re-selection (T1), wherein the measurement period is determined based on a number of consecutive Discontinuous Reception (DRX) cycles; determining a number of measurement occasions configured with a Discovery Reference Signal (DRS) in the serving cell during T1; determining availability of the DRS at the measurement occasions; and performing measurement based on availability of the DRS at the measurement occasions during T1. In this way, a wireless device may operate in NR RRC_IDLE/RRC_INACTIVE in the presence of CCA, e.g., Listen-Before-Talk (LBT).

Aspects of embodiments provide methods in a UE in a low RRC activity state (e.g., idle state, inactive state) for performing measurements on serving cell and/or on neighbor cells, which are subjected to LBT, for the purpose of cell selection and/or for cell reselection procedures. In low RRC activity states the UE may measure once every Discontinuous Reception (DRX) cycle even if the DRSs are transmitted more frequently compared to the DRX cycle. The UE may therefore typically attempt to receive DRSs during one DRS occasion per DRX cycle. If there is LBT failure in the base station whose DRSs are to be measured, then the UE is unable to receive the DRS during that DRX cycle.

In one aspect of an embodiment, the UE may be allowed to filter any two measurement samples of the measured cell (e.g., serving cell (also referred to herein as cell1), neighbor cell (also referred to herein as cell2)), which are separated in time by no more than a certain number of DRS occasions that are not available at the UE due to LBT failure in the measured cell.

In another aspect of an embodiment, the UE may adapt the measurement times (e.g., evaluation time for cell selection, reselection etc.) for measurement on the measured cell (e.g., cell1, cell2) according to the number of DRS occasions not available at the UE due to LBT failure in the measured cell.

In yet another aspect of an embodiment the UE may be required to perform measurements on one or more neighbor cells in case the UE is unable to receive certain number of DRS occasions due to LBT failure in cell1 regardless of the signal level of cell1 (e.g., measured previously).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 illustrates methods implemented in a communication system including a host computer, a base station and a user equipment in accordance with some embodiments;

FIG. 10 illustrates methods implemented in a communication system including a host computer, a base station and a user equipment in accordance with some embodiments;

DETAILED DESCRIPTION

Figure 1:
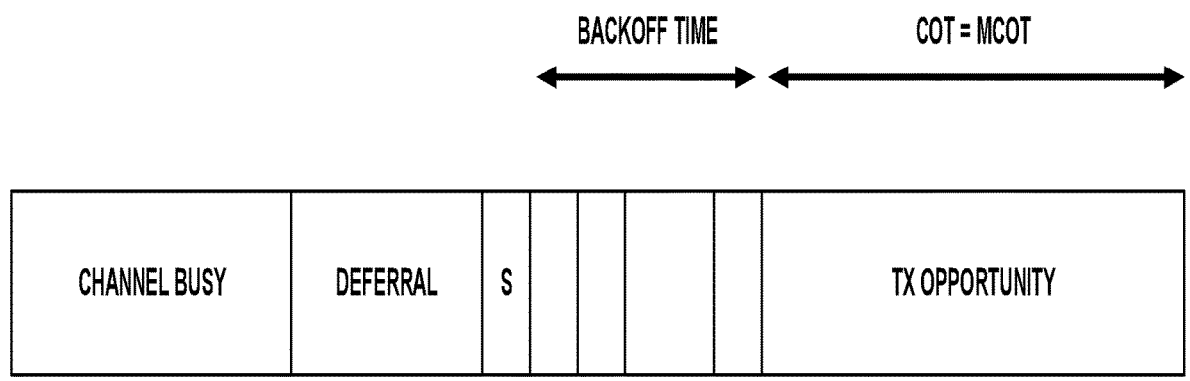
FIG. 1 illustrates Long Term Evolution (LTE) Listen-Before-Talk (LBT) procedure and Channel Occupancy Time (COT)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

In LTE, only Secondary Cells (SCells) can be configured in unlicensed spectrum, hence, no LBT-based procedures exist in LTE. In NR, standalone NR-U operation is yet to be fully configured, which means that UE will have to deal with LBT failures even in RRC_IDLE.

Figure 2:
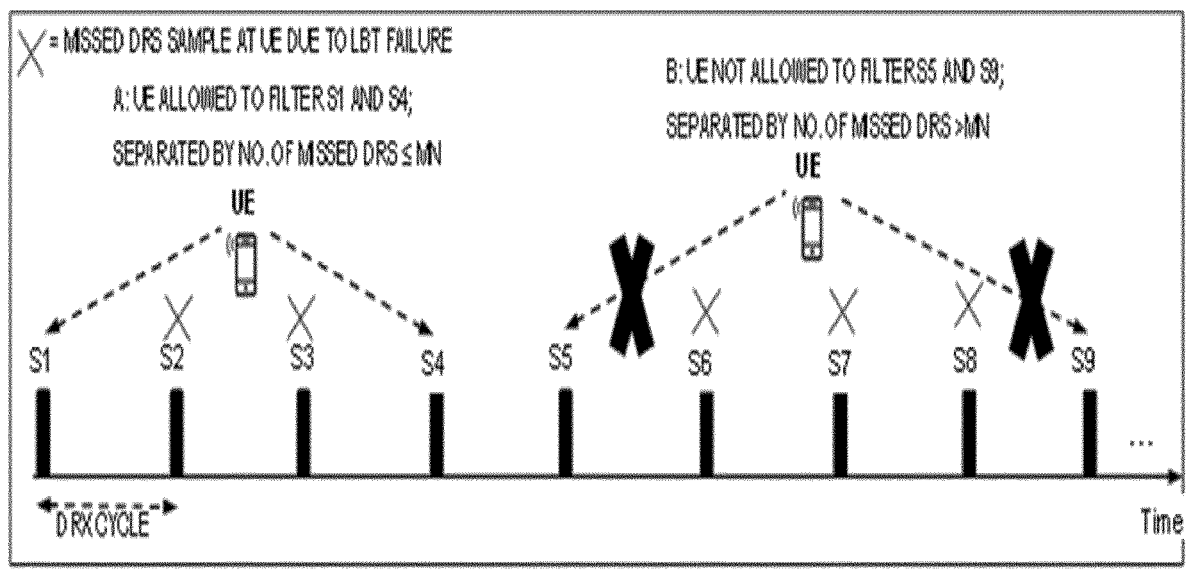
FIG. 2 illustrates an example showing the UE is allowed to filter two closest in time available samples provided they are not separated by more than Mn number of DRS occasions (between the two samples) missed at the UE due to LBT failure in the cell.

FIG. 2 illustrates an example showing the UE is allowed to filter two closest in time available samples provided they are not separated by more than Mn number of DRS occasions (between the two samples) missed at the UE due to LBT failure in the cell. An example is shown in FIG. 2 assuming Mn=2. It is assumed that the UE measures DRS of the measured cell once every DRX cycle. As shown in FIG. 2 that in case A where the samples S1 and S4 are separated by 2 missed DRS samples (S2 and S3), the UE is allowed to combine S1 and S4. However in case B where the samples S5 and S9 are separated by 3 missed DRS samples (S6, S7 and S8), the UE is not allowed to combine S5 and S9.

Figure 3:
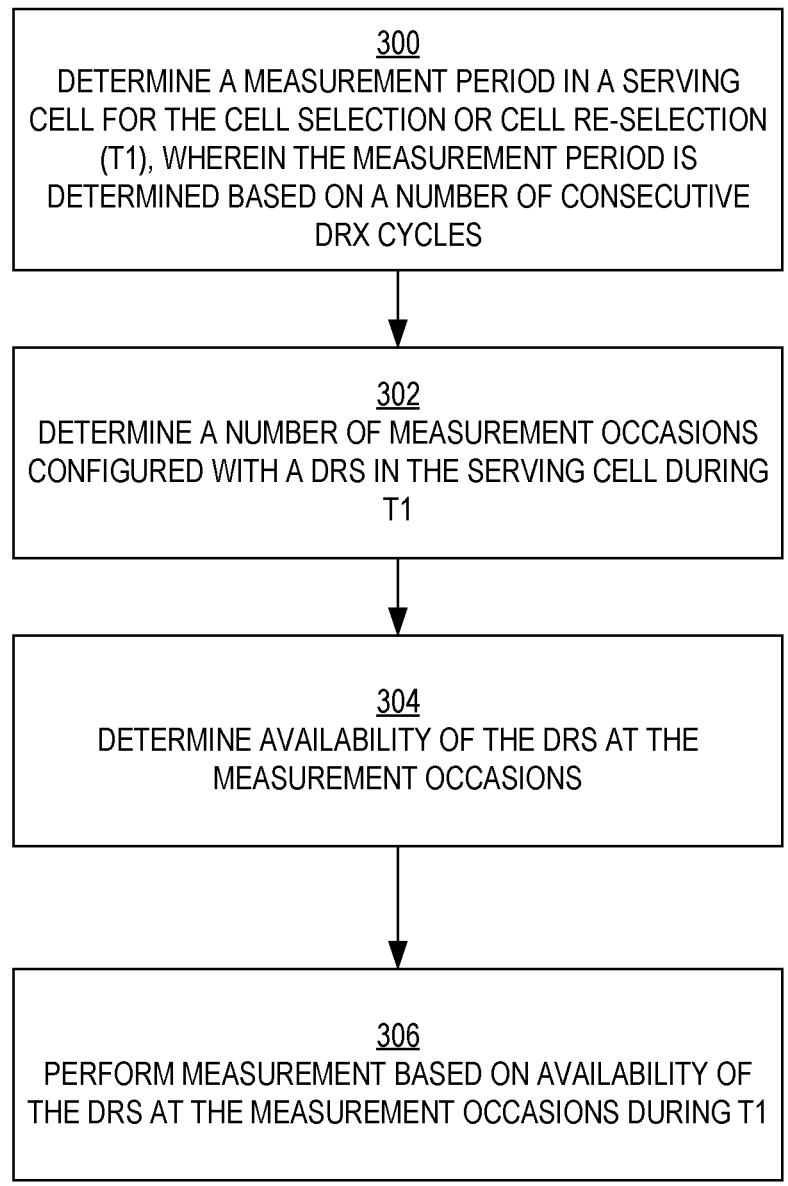
FIG. 3 illustrates a method of operating a wireless device or cell selection accounting for CCA requirements.

Systems and methods for User Equipment (UE) operation in presence of Clear Channel Assessment (CCA) are provided. FIG. 3 illustrates a method of operating a wireless device or cell selection accounting for CCA requirements. In some embodiments, a method performed by a wireless device for cell selection accounting for requirements includes: determining (step 300) a measurement period in a serving cell for the cell selection or cell re-selection (T1), wherein the measurement period is determined based on a number of consecutive Discontinuous Reception (DRX) cycles; determining (step 302) a number of measurement occasions configured with a Discovery Reference Signal (DRS) in the serving cell during T1; determining (step 304) availability of the DRS at the measurement occasions; and performing (step 306) measurement based on availability of the DRS at the measurement occasions during T1. In this way, a wireless device may operate in NR RRC_IDLE/RRC_INACTIVE in the presence of CCA, e.g., Listen-Before-Talk (LBT).

Aspects of embodiments provide methods in a UE in a low RRC activity state (e.g., idle state, inactive state) for performing measurements on serving cell and/or on neighbor cells, which are subjected to LBT, for the purpose of cell selection and/or for cell reselection procedures. In low RRC activity states the UE may measure once every Discontinuous Reception (DRX) cycle even if the DRSs are transmitted more frequently compared to the DRX cycle. The UE may therefore typically attempt to receive DRS during one DRS occasion per DRX cycle. If there is LBT failure in the base station whose DRS are to be measured then the UE is unable to receive the DRS during that DRX cycle.

The term LBT is used herein to describe one example of a CCA. However, the current disclosure is not limited thereto. Any discussion herein regarding LBT could also be applicable to any suitable type of CCA.

In one aspect of an embodiment the UE may be allowed to filter any two measurement samples of the measured cell (e.g., serving cell (also referred to herein as cell1), neighbor cell (also referred to herein as cell2)), which are separated in time by no more than a certain number of DRS occasions that are not available at the UE due to LBT failure in the measured cell.

In another aspect of an embodiment, the UE may adapt the measurement times (e.g., evaluation time for cell selection, reselection etc.) for measurement on the measured cell (e.g., cell1, cell2) according to the number of DRS occasions not available at the UE due to LBT failure in the measured cell.

In yet another aspect of an embodiment, the UE may be required to perform measurements on one or more neighbor cells in case the UE is unable to receive certain number of DRS occasions due to LBT failure in cell1 regardless of the signal level of cell1 (e.g., measured previously).

An embodiment provides a method performed by a wireless device for cell selection accounting for LBT requirements, the method comprising: determining, using at least one DRS from at least one cell, a cell to select or reselect; and selecting or reselecting the determined cell. By taking into account LBT requirements when determining a cell to select or reselect, the wireless device is able to operate in a low RRC activity state even in systems using LBT (such as NR systems), thereby increasing the number of cells the wireless device may connect to. By implementing the described UE behaviours adapted for systems using LBT, the method also controls the time needed for the UE to perform the cell (re)selection procedure while ensuring that excessive delays in the procedure are prevented. As wireless devices in low RRC activity states may use less power than normal RRC activity states, embodiments may therefore provide increased wireless device battery lifetimes.

An embodiment provides a method performed by a base station for facilitating cell selection accounting for LBT requirements, the method comprising:
    configuring LBT parameters and/or COT parameters to facilitate cell selection by a wireless device. By adapting configuration to assist wireless device connection in low RRC activity states, the base station may provide improved wireless device connectivity and may also help to reduce wireless device power consumption (as instances of wireless devices being required to maintain normal RRC activity states rather than low RRC activity states may be reduced).

Aspects of embodiments may provide the possibility for a UE to operate in NR RRC_IDLE in the presence of LBT. Aspects of embodiments may additionally or alternatively provide the possibility for a UE to operate in NR RRC_INACTIVE in the presence of LBT.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The term network node may be used to correspond to any type of radio network node or any network node, which communicates with a UE and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, Remote Radio Unit (RRU), Remote Radio Head (RRH), nodes in distributed antenna system (DAS), core network node (e.g., Mobile Switching Center, Mobility Management Entity (MME), etc.), Operation & Maintenance, Operations Support System, Self-Organizing Network, positioning node or location server (e.g., Evolved-Serving Mobile Location Center), Minimization of Drive Tests (MDTs), test equipment (physical node or software), etc. A radio network node is network node capable of transmitting radio signals, e.g., base station, gNB, etc.

The term user equipment (UE) or wireless device (WD) may be used to refer to any type of wireless device communicating with a network node and/or with another UE/WD in a cellular or mobile communication system. Examples of UE are wireless device supporting NR, target device, device to device (D2D) UE, machine type UE or UE capable of machine to machine (M2M) communication, PDA, PAD, Tablet, mobile terminals, smart phone, laptop embedded equipped, laptop mounted equipment, drone, USB dongles, ProSe UE, Vehicle-to-Vehicle UE, Vehicle to Everything, UE, etc.

The term radio node may be used to refer to radio network nodes or UEs capable of transmitting radio signals or receiving radio signals or both.

The term time resource used herein may correspond to any type of physical resource or radio resource expressed in terms of length of time or time interval or time duration. Examples of time resources are: symbol, mini-slot, time slot, subframe, radio frame, Transmission Time Interval (TTI), interleaving time, etc.

The term TTI may be used to refer to any time period over which a physical channel can be encoded and interleaved for transmission. The physical channel may be decoded by the receiver over the same time period (T0) over which it was encoded. The TTI may also be referred to as a short TTI (sTTI), transmission time, slot, sub-slot, mini-slot, Short Subframe (SSF), mini-subframe etc.

Unless explicitly stated otherwise, the term Listen Before Talk or acronym LBT may be used herein to refer to DL LBT, UL LBT, or both. DL LBT may be performed by a radio network node, while UL LBT may be performed by UE, hence generically speaking LBT may be performed by a radio node. The terms "LBT category" and "LBT type" refer to a set of parameters characterizing LBT procedure, which may comprise, for example: LBT categories described in Section 2.1, LBT with different switching delays between UL and DL (e.g., up to 16 µs, longer than 16 but shorter than 25, or 25 µs and above), beam-based LBT (LBT in a specific direction) or omni-directional LBT, different LBT approaches in frequency domain (e.g., sub-band-specific, wideband LBT over multiple contiguous sub-bands, wideband LBT over multiple non-contiguous sub-bands, etc.), LBT with or without shared COT. LBT is also interchangeably and more generally referred to as Clear Channel Assessment (CCA), Carrier Sense Multiple Access (CSMA) procedure, channel assessment scheme etc. The CCA based operation is more generally called contention-based operation. The transmission of signals on a carrier subjected to CCA is also called contention-based transmission. The contention-based operation is typically used for transmission on carriers of unlicensed frequency band, however the mechanism may also be used when operating on carriers belonging to licensed band for example to reduce interference. The transmission of signals on a carrier which is not subjected to CCA is also called contention free transmission.

The term Channel Occupancy Time (COT) configuration may comprise one or more parameters characterizing the beginning of COT, length of COT, end of COT, carrier frequencies for which the COT is applicable, shared or not shared COT, fixed-length COT or variable-length COT, etc.

The term Discovery Signal (DRS) is used herein to refer to one or more signals transmitted by a radio network node. DRS may be transmitted periodically with certain periodicity e.g., 20 ms, 40 ms, 80 ms, 160 ms etc. DRS may be used by the UE for performing measurements on a cell. Each DRS occasion, which typically occur periodically, contains one or more DRS signals. The DRS signals may comprise, e.g., Synchronization Signal Block (defined in TS 38.133), Primary Synchronization Signal/Secondary Synchronization Signal, Physical Broadcasting Channel, Demodulated Reference Signal, Channel State Information-Reference Signal, Remaining Minimum System Information (RMSI)-Control Reference Set (CORESET)(s), RMSI-Physical Downlink Shared Channel(s), Other System Information, paging, etc. The UE is configured with information about DRS on cells of a particular carrier, which may be referred to as a Discovery Measurement Timing Configuration (DMTC), which may comprise e.g., DMTC periodicity, DMTC occasion length in time or duration, DMTC time offset with respect to reference time (e.g., serving cell's System Frame Number). The DMTC configuration may also be a SSB-based Measurement Timing Configuration (SMTC) e.g., SMTC periodicity, occasion, offset as SMTC periodicity, occasion, offset respectively.

For ease of understanding, the embodiments may be described for NR. As will be appreciated, the embodiments are applicable to any other RAT or multi-RAT systems, where a UE receives and/or transmit signals (e.g., data) e.g., NR, LTE Frequency Division Duplexing/Time Division Duplexing, Wideband Code Division Multiple Access/High Speed Packet Access, WiFi, Wireless Local Area Network, LTE, 5G, any NR (standalone or non-standalone), etc.

Methods in UEs to perform cell (re)selection in presence of LBT: In accordance with aspects of embodiments, a UE performs cell selection and/or cell reselection while accounting for LBT due to which DRS transmitted from some or all cells on a carrier frequency may be not available. In some aspects of embodiments, the UE may perform a method device for cell selection accounting for LBT requirements, the method comprising: determining, using at least one DRS from at least one cell, a cell to select or reselect; and selecting or reselecting the determined cell. In the context of some aspects of embodiments, the term "reselect" is used to indicate that a cell which is serving a UE at the time of the start of the cell selection procedure is selected to continue to serve the cell in the cell selection procedure; the cell is reselected.

The enhanced cell selection and/or reselection (wherein the reselection may be on the same or different carrier frequency) procedure may be in accordance with one or more of the aspects, embodiments and/or examples discussed in the following points, numbered 1 to 20.

An extended duration for performing the determining is used if LBT is in use, the extended duration being extended relative to a duration used where LBT is not in use. The cell (re)selection time (T1) in presence of LBT may be extended due to LBT failure compared to the operation without LBT (T0). T1 may comprise, e.g., any one or more of: T_detect, T_evaluate, T_measure where: T_detect=time required to evaluate whether a newly detectable cell meets the reselection criteria; T_evaluate=time required to evaluate that a cell that has been already detected but not reselected has met the reselection criterion; T_measure=measurement periodicity of already identified cells.

The duration may further depend on LBT/COT-related parameters and characteristics. The duration may further depend on other parameters such as DRX cycle length, e.g., the extension is increasing non-linearly with LBT/COT-related parameters and DRX cycle length (e.g., fewer occasions are allowed for compensating for LBT failures with a longer DRX cycle length), and DRS properties.

The cell (re)selection procedure may be intra-frequency, inter-frequency, or inter-RAT. T1 may be measured in time units, e.g., ms, or in the number of configured DRS occasions, number of DRX cycles, or a function of both, or any other suitable unit.

In general, the cell (re)selection time may be a function of one or more LBT/COT-related parameters, e.g.: T1(M, C_LBT, COT, DRS_LBT, DRX_LBT, N1_LBT)>T0, where:

M is the number of configured NR DRS occasions in the target cell not available at the UE during T1 due to LBT failure (i.e., due to the absence of the necessary radio signals from the cell and/or beam). The UE may autonomously detect the LBT failure by detecting the absence of signals expected to be received by the UE during a DRS occasion. For example, if the received signal level at the UE is below a certain detection level during the DRS occasion, then the UE may assume that the DRS is not transmitted by the base station due to the LBT failure. Additionally or alternatively, the UE may be informed about LBT failure and thus absence of any signals by explicit signaling from the network node, e.g., via broadcast information, SI about recent one or more LBT outcome. Additionally or alternatively, the UE may be explicitly informed about LBT success and/or COT characteristics or the availability of one or more DRS occasions due to LBT success.

C_LBT is the LBT category or type, as discussed above. COT is the actual or the maximum channel occupancy time of a transmitting node. DRS_LBT is one or more DRS configurations applicable in presence of LBT. (e.g., shifted DRS occasions, symbol mapping and/or index mapping for one or more DRS signals applicable only when LBT is used and not applicable otherwise, etc.). DRX_LBT is a DRX configuration applicable in presence of LBT (e.g., long DRX such as DRX periodicity above some threshold may be applicable without LBT but may be not applicable in presence of LBT). N1_LBT is the RX beams related scaling factor in NR (for frequency ranges below 6 GHz N1=1, for frequency ranges above 24 GHz it is up to 8) which may be different in presence of LBT, e.g., N1=2 without LBT and N1=1 in presence of LBT for the same frequency.

In aspects of embodiments, at least prior to performing the cell (re)selection to a target cell (cell2), the UE shall measure the signal level (e.g., Synchronization Signal (SS)-Reference Signal Received Power (RSRP) and SS-Reference Signal Received Quality (RSRQ) levels) of the serving cell (cell1) and evaluate the cell selection criterion S for the serving cell (cell1) during a plurality of DRX cycles, for example during at least $(K+Ms)*M1*N1$ DRX cycles; where:

M1=2 if DMTC periodicity (TDMTC)>threshold1 (e.g., 20 ms) and DRX cycle≤threshold2 (e.g., 0.64 second), otherwise M1=1.

Ms is the number of configured DRS occasions in the serving cell not available at the UE due to LBT failure during the serving cell evaluation time (e.g., Nserv in Table 2, see below).

The cell selection criterion S for cell1 is met if the measured signal level(s) of cell1 is above their respective thresholds (e.g., RxLev derived from SS-RSRP and RxQual derived from SS-RSRQ are above 0 dB).

In some examples, K is a pre-defined number, e.g., K=1. Alternatively, K may depend on DRX cycle length.

N1 is the rx beam related scaling factor as described above.

TABLE 2

| DRX cycle length [s] | Scaling Factor (N1) FR1 | pR2 Note1 | $N_{serv}$ [number of DRX cycles] |
|---|---|---|---|
| 0.32 | 1 | 8 | $(K + Ms)*M1*N1*4$ |
| 0.64 | | 5 | $(K + Ms)*M1*N1*4$ |
| 1.28 | | 4 | $(K + Ms)*N1*2$ |
| 2.56 | | 3 | $(K + Ms)*N1*2$ |

Note 1:
Applies for UE supporting power class 2&3&4. For UE supporting power class 1, N1 = 8 for all DRX cycle length.

In some aspects of embodiments, the determining further comprises measuring the number of DRS instances wherein the current serving cell is not available against a missed DRS threshold. If parameter Ms (see above) is below a threshold (Hs) then the UE may perform the serving cell evaluation according to the evaluation time in Table 2; otherwise the UE may restart the measurement for the serving cell evaluation. For example, the UE may discard the previous measurement samples and use the new samples after restarting the measurement for serving cell evaluation. The threshold Hs may depend on the DRX cycle e.g., Hs is larger for smaller DRX cycle compared to that for larger DRX cycle. Examples of threshold Hs are 2, 4, 6 etc. For examples Hs=2, 4, 6 and 8 for DRX cycles of 2.56 s, 1.28 s, 0.64 s and 0.32 s respectively. As a special case, if Ms=0, the UE may meet the legacy measurement requirements T0 where T0<T1 as explained above (see above).

In some aspects of embodiments, the step of determining may comprise, when evaluating the selection of a cell using LBT, detecting the presence of DRS prior to performing a measurement based on DRS. The cell (re)selection to a target cell (cell2), which is subjected to LBT, in the presence of LBT may be enhanced by performing an additional step of detecting the presence of DRS prior to performing the measurement based on DRS and evaluating whether cell (re)selection criterion is met.

In some aspects of embodiments, the evaluation time T_evaluate may be a function (e.g., proportional to) of (n_DRS_detect+m_DRS_measure+Me) and the detection time T_detect may be a function (e.g., proportional to) of (n_DRS_detect+Md), wherein:

n_DRS_detect is the number of DRS occasions necessary to detect the presence of DRS (e.g., n_DRS_detect=12 for the shortest DRX);

m_DRS_measure is the number of samples necessary to perform a measurement and evaluate based on the detected DRS (e.g., m_DRS_detect=16 for the shortest DRX);

Md is the number of configured DRS occasions in the target cell not available at the UE due to LBT failure in the target cell during the detection time (e.g., Tdetect, NR_Intra in Table 3, see below);

Mm is the number of configured DRS occasions in the already detected target cell not available at the UE due to LBT failure in the target cell during the measurement time (e.g., Tmeasure,NR_Intra in Table 3);

Me is the number of configured DRS occasions in the target cell not available at the UE due to LBT failure in the target cell during the evaluation time (e.g., Tevaluate,NR_Intra in Table 3).

In some aspects of embodiments, if parameter Mm (see above, Table 3) is below a certain threshold (Hm) then the UE may measure cell2 according to the measurement time in Table 3; otherwise the UE may restart the measurement for cell2. For example the UE may discard the previous measurement samples and use the new samples after restarting the measurement for cell2 measurement. The threshold Hm may also depend on the DRX cycle e.g., Hm is larger for smaller DRX cycle compared to that for larger DRX cycle. Examples of threshold Hm are 2, 4, 6 etc. For examples Hm=2, 4, 6 and 8 for DRX cycles of 2.56 s, 1.28 s, 0.64 s and 0.32 s respectively. As a special case, if Mm=0, UE may meet the legacy measurement requirements T0 where T0<T1 as explained above (see above).

In some aspects of embodiments, if parameter Me (see above, Table 3) is below a certain threshold (He) then the UE may evaluate cell2 according to the evaluation time in Table 3; otherwise the UE may restart the measurement for evaluation of cell2. For example the UE may discard the previous measurement samples and use the new samples after restarting the measurement for evaluation of cell2. The threshold He may also depend on the DRX cycle e.g., He is larger for smaller DRX cycle compared to that for larger DRX cycle. Examples of threshold He are 2, 4, 6 etc. For examples He=2, 4, 6 and 8 for DRX cycles of 2.56 s, 1.28 s, 0.64 s and 0.32 s respectively. As a special case, if Me=0, the UE may hall meet the legacy measurement requirements T0 where T0<T1 as explained above (see above).

TABLE 3

Example intra-frequency detection, measurement, evaluation times in presence of LBT

| DRX cycle length [s] | Scaling Factor (N1) FR1 | Scaling Factor (N1) FR2 Note1 | $T_{detect,NR\_Intra}$ [s] {number of DRX cycles} | $T_{measure,NR\_Intra}$ [s] {number of DRX cycles} | $T_{evaluate,NR\_Intra}$ [s] {number of DRX cycles} |
|---|---|---|---|---|---|
| 0.32 | 1 | 8 | 0.32 × (K1 + Md) × N1 × M2 {(K1 + Md) × N1 × N2} | 0.32 × (X1 + Mm) × N1 × M2 {(X1 + Mm) × N1 × M2} | 0.32 × (Y1 + Me) × N1 × M2 {(Y1 + Me) × N1 × M2} |
| 0.64 | | 5 | 0.64 × (K2 + Md) × N1 {(K2 + Md) × N1} | 0.64 × (X2 + Mm) × N1 {(X2 + Mm) × N1} | 0.64 × (Y2 + Me) × N1 {(Y2 + Me) × N1} |
| 1.28 | | 4 | 1.28 × (K3 + Md) × N1 {(K3 + Md) × N1} | 1.28 × (X3 + Mm) × N1 {(X3 + Mm) × N1} | 1.28 × (Y3 + Me) × N1 {(Y3 + Me) × N1} |
| 2.56 | | 3 | 2.56 × (K4 + Md) × N1 {(K4 + Md) × N1} | 2.56 × (X4 + Mm) × N1 {(X4 + Mm) × N1} | 2.56 × (Y4 + Me) × N1 {(Y4 + Me) × N1} |

Note 1:
Applies for UE supporting power class 2&3&4. For UE supporting power class 1, N1 = 8 for all DRX cycle length.
Note 2:
M2 = 1.5 if DMTC periodicity of measured intra-frequency cell >20 ms; otherwise M2 = 1.

In the above, in aspects of embodiments: {K1=36, K2=28, K3=25, K4=23} and/or {X1=4, X2=2, X3=X4=1} and/or {Y1=16, Y2=8, Y3=5, Y4=3}. In other aspects of embodiments, {K1>36, K2>28, K3>25, K4>23} and/or {X1>4, X2>2, X3>1, X4>1} and/or {Y1>16, Y2>8, Y3>5, Y4>3}, e.g., to account for the fact that the UE needs to first detect the actual presence of the DRS signal (which may be missing due to LBT failure) prior to using the sample. In other aspects of embodiments, {K1=12, K2=10, K3=8, K4=7[ and/or {Y1=12, Y=10, Y3=8, Y4=7} wherein K1/2/3/4 and Y1/2/3/4 account for the fact that the UE needs to first detect the actual presence of the DRS signal (which may be missing due to LBT failure) prior to using the sample and ensure that UE performance in presence of DRS is not much delayed compared to the legacy performance and so UE performs the actions more intensively and may save less power.

In aspects of embodiments, the step of determining comprises measuring a signal from a cell on two (or more) instances, and determining whether the cell should be selected or reselected using a combination of the measurements from the two (or more) instances. The UE may be required to filter the measurements (e.g., SS-RSRP and/or SS-RSRQ) of the measurement cell (which can be cell1 or cell2) using at least two measurements. In some aspects of embodiments, within the set of measurements used for the filtering, at least two measurements are spaced by at least a first number of DRX cycles, for example, DRX cycle/2. In further aspects of embodiments, when the measured cell is subjected to LBT, the UE shall be required to filter the measurements of the measured cell provided that they are separated in time by at least a first number of DRX cycles (such as DRX/2) but not separated in time by more than a second number of DRX cycles, such as Mn number of DRS occasions missed at the UE due to LBT failure in the measured cell. The parameter Mn may further depend on DRX cycle.

In some aspects of embodiments, the step of determining comprises evaluating whether a current serving cell satisfies a cell selection criteria and, if the current serving cell does not satisfy the cell selection criteria, initiating measurements of all neighbor cells indicated by the current serving cell. If the serving cell does not fulfil the cell selection criterion S, then the UE may initiate the measurements of all neighbour cells indicated by the serving cell, regardless of the measurement rules currently limiting UE measurement activities. In yet another exemplary embodiment, if the UE is unable to perform measurement on the serving cell during at least Mp number of DRX cycles due to Mp number of missed DRS occasions of the serving cell at the UE due to LBT failure, then the UE may initiate the measurements of all neighbour cells indicated by the serving cell, regardless of the measurement rules currently limiting UE measurement activities. Mp may further depend on DRX cycle. Mp can be 8, 4, 2 and 2 for DRX cycles of 0.32 s, 0.64 s, 1.28 s and 2.56 s respectively.

In some aspects of embodiments, the step of determining comprises evaluating whether a signal from a current serving cell satisfies a condition and, if the signal is determined to satisfy the condition, determining that the current serving cell should be reselected without performing further measurements. If the serving cell fulfils the condition (Srxlev>SIntraSearchP and Squal>SIntraSearchQ), then the UE may choose not to perform measurements (e.g., intra-frequency in one example and inter-frequency in another example and inter-RAT in a third example); otherwise, the UE may perform the measurements. Srxlev and Squal are derived from serving cell measurements (SS-RSRP and SS-RSRQ respectively) and SIntraSearchP and SIntraSearchQ are thresholds. This means the UE only measures on neighbor cells of the serving carrier when the serving cell becomes weak, e.g., low signal level with regard to thresholds. In yet another exemplary embodiment, if the UE is unable to perform serving cell measurements (e.g., SS-RSRP and SS-RSRQ) during at least Mq number of DRX cycles due to Mq number of missed DRS occasions of the serving cell at the UE due to LBT failure then the UE may initiate the measurements on the neighbor cells of the serving carrier frequency regardless of the above condition i.e., measurements on the neighbor cells (e.g., intra-frequency neighbors in one example and inter-frequency neighbors in another example and inter-RAT neighbors in a third example).

Further, if the serving cell fulfils the condition (Srxlev>SnonIntraSearchP and Squal>SnonIntraSearchQ) then the UE may choose not to perform measurements of NR inter-frequencies or inter-RAT frequency cells of equal or lower priority; otherwise, the UE may perform measurements of NR inter-frequencies or inter-RAT frequency cells of equal or lower priority. SnonIntraSearchP and SnonIntraSearchQ are thresholds. This means the UE only measures on neighbor cells of the non-serving carrier when the serving cell becomes weak e.g., low signal level with regard to thresholds. In yet another exemplary embodiment, if the UE is unable to perform serving cell measurements (e.g., SS-RSRP and SS-RSRQ) during at least Mr number of DRX cycles due to Mr number of missed DRS occasions of the serving cell at the UE due to LBT failure, then the UE shall initiate the measurements on the neighbor cells of one or more non-serving carrier frequencies regardless of the above condition i.e., measurements on inter-frequency neighbor cells and/or on inter-RAT neighbor cells. The non-serving carrier frequencies which the UE may measure when it cannot do measurement due to LBT failure can also be specifically configured. The configuration of such non-serving carrier frequencies can be based on a rule, which can be pre-defined, can be signalled to the UE by the network node (e.g., as part of measurement configuration), autonomous determination by the UE etc. Examples of rules are K1 and K2 number of inter-frequency and inter-carriers, first or last K1 and K2 inter-frequency and inter-carriers in the configured list of carriers etc. In one example the measured cell is cell1, i.e., the serving cell. The values of Mr and Mq (as discussed above, for example) can be different. For example, Mr can be larger than Mq assuming that the UE continues attempting to receive DRS in the serving cell even if number of missed DRS occasions of the serving cell exceeds Mq.

In some aspects of embodiments, the UE may apply the evaluating using at least a 2-step approach. In an example of a 2-step approach, in the first step if the number of missed DRS occasions of the serving cell exceeds Mq then the UE starts measurements on intra-frequency neighbor cells. If the UE is unable to perform measurements on the intra-frequency neighbor cells also due to LBT failure (e.g., if number of missed DRS occasions of the intra-frequency neighbor cell being measured exceeds Mr) then the UE shall initiate the measurements on the neighbor cells of one or more non-serving carrier frequencies regardless of the above. In this case the non-serving carrier frequencies which the UE shall measure when cannot do measurement on the intra-frequency neighbor cells due to LBT failure can also be configured according to the same rules described above.

In aspects of embodiments, when parameter M (described above) is below a threshold and/or T1 is below a second threshold the UE may perform the enhanced cell (re)selection (the UE may further be required to meet a first requirement in this case), otherwise the UE may perform another procedure, e.g.: stopping or restarting the enhanced cell (re)selection procedure or the measurement or the valuation, operating according to a second (more relaxed) requirement or in a best effort. The first and/or the second threshold for M and T1, respectively, may be pre-defined, signaled (e.g., in system information), pre-configured or stored in the UE, determined based on the current camping cell threshold value (e.g., same as for the camping cell), or may be depend on any one or more of: DRX cycle length (e.g., larger threshold with a longer DRX cycle length), scaling factor N1, frequency range (e.g., FR1 or FR2), DRS periodicity, procedure type (e.g., different thresholds for detection, evaluation and measurement), signal level (e.g., signal strength or quality such as RSRP, Signal to Interference plus Noise Ratio (SINR), Es/IoT, RSRQ, Signal to Noise Ratio (SNR)), etc.

In aspects of embodiments, the enhanced cell (re)selection procedure may comprise adapting the detecting the presence of DRS to the determined LBT category or type and/or COT.

In further aspects of embodiments, the UE may obtain and store information on cells. The UE may obtain and store LBT-related information, e.g., whether a cell or carrier is using LBT, statistics on DRS availability, etc. This information may be further used by the UE, e.g., when performing cell selection or reselection based on the stored information or providing it to the network.

When LBT is used, the enhanced cell (re)selection procedure may further comprise the UE determining one or more DRS configurations applicable in presence of LBT and performing the detection of DRS based on the determined DRS configuration(s); such DRS configuration may comprise SSB configuration (e.g., SSB allocation in time domain including SSB symbol mapping etc.) which is different from without LBT.

In some aspects of embodiments the UE may support or operate under a relaxed serving cell measurement mode (also known as relaxed serving cell monitoring) such that the frequency with which the steps of determining and selecting are performed is reduced if the UE satisfies quality criteria. The relaxed serving cell measurement mode may allow the UE to measure on cell1 less frequently (on Nth DRX cycle where N is a configured parameter) than in normal measurement mode (wherein UE typically measures on every DRX cycle) provided that the UE has fulfilled certain criteria. The UE may evaluate the criteria for entering the relaxed serving cell measurement mode by taking into account the LBT outcome. For example, if the UE was unable to measure on cell1 for at least Mp number of DRX cycles due to Mp number of missed DRS occasions, then UE may not enter the relaxed serving cell measurement mode, or if it is already in relaxed mode it may leave the relaxed measurement mode and enter the normal measurement mode. Alternatively, the UE may restart the measurements for evaluating the relaxed measurement mode criteria. Alternatively, the UE may use different thresholds for evaluating the relaxed serving cell measurement mode. In one specific example, the UE can be required to meet the S criterion by X dB over last N DRX cycles, where X and N are configurable parameters.

In some aspects of embodiments, the UE may be configured to operate using a relaxed neighboring cell monitoring mode, such that the quality of connection with neighbor cells is measured if the UE does not satisfy further quality criteria. The relaxed neighbor cell measurement mode (also known as relaxed neighbor cell monitoring) may allow the UE to only measure on the serving cell provided that the UE has fulfilled certain criteria. In yet another exemplary embodiment, the UE evaluates the criteria for entering the relaxed neighbor cell monitoring by taking into account the LBT outcome. For example, if the criteria for entering the relaxed neighbor cell monitoring includes following condition among other rules:

(SrxlevRef−Srxlev)<SSearchDeltaP where Srxlev is derived from the serving cell, and SrxlevRef and SSearchDeltaP are reference values and threshold respectively. In yet another exemplary embodiment, if the UE is unable to perform serving cell measurements (e.g., SS-RSRP) during at least Mq number of DRX cycles due to Mq number of missed DRS occasions of the serving cell at the UE due to LBT failure then the UE shall initiate the measurements on the neighbor cells of the configured carriers regardless of the above conditions, i.e., the UE shall exit the relaxed monitoring mode and enter the normal measurement mode. Alternatively, it shall restart the measurements for evaluating the relaxed measurement mode criteria. Alternatively, it shall use different thresholds and reference value (SrxlevRef' and SSearchDeltaP') for evaluating the criteria for entering the relaxed neighbor cell monitoring.

In some aspects of embodiments, the UE may be configured to operate using an early termination of control channel monitoring mode, such that the UE stops attempting to receive or decode a channel when the estimated signal quality for the channel falls below an estimated signal quality threshold. The control channel may comprise, for example a Physical Downlink Control Channel (PDCCH), or specific type of signals (e.g., wake-up signal). The early termination feature may allow the UE stop attempting to receive or decode certain channels/signals based on estimated signal quality (e.g., SNR, SINR). For example, if the SNR or received energy level is below a certain threshold (e.g., Z dB), then the UE may stop receiving or stop decoding attempts of any particular channels or signals. In some embodiments, if the UE is unable to receive any downlink channel or signal due to LBT failure, then it may not perform any early termination of any channel or signal, instead it may continue to receive or decode the channel/signals until the last symbol. In another example, it shall use different threshold (e.g., Z' dB) for evaluating the early termination criteria, where Z'>Z. In other embodiments, the early termination may still be performed in presence of LBT but not before the UE has detected more than Q (e.g., Q=1, 2 or 3) LBT failures (and thus PDCCH was not present due to LBT failures).

Any of the aspects of embodiments described herein may be performed while the UE is in a low RRC state (e.g., idle state, inactive state).

The following are example steps which may be performed in the UE in some aspects of embodiments:

Step 1: Determining whether LBT is used.

Step 2: Based on the determining result, performing a first cell (re)selection procedure if LBT is used, otherwise performing a second cell (re)selection procedure (enhanced cell (re)selection examples described above) and camping on a cell which is performing LBT.

Upon determining poor performance, e.g., exceeded performance related threshold such as the number of consecutive LBT failure or total LBT failures during the enhanced cell (re)selection procedure and/or exceeded time T1, the enhanced cell (re)selection procedure may further comprise restarting the procedure and/or triggering the enhanced cell (re)selection procedure on a different cell or even a different carrier frequency or another part of the frequency band or another RAT or triggering cell (re)selection procedure on cells/carriers/RATs where LBT is not present.

Step 3: Performing one or more operational tasks while camping on a cell which is performing LBT, e.g., network registration, cell reselection to another cell, performing and logging Minimization DT measurements, any task relevant for the camped normally state or camped on any cell state (as discussed above), etc.

Step 4: Logging one or more performance characteristics or statistics related to UE operation in RRC_IDLE and/or RRC_INACTIVE in presence of LBT for later reporting to a network node or alternatively try to report immediately. For example, such performance characteristics may be indicative of whether one or more thresholds (such as described in the current disclosure) configured for UE operation in RRC_IDLE or RRC_INACTIVE in presence of LBT has been exceeded and/or the UE was not able to complete or had to restart the enhanced cell (re)selection procedure due to exceeding the threshold number of allowed LBT failures and/or too long time for the cell (re)selection procedure. A log may be an MDT or other log. Alternatively, the UE may initiate network connection for sending such a report, indication, or message to a network node to indicate poor performance in RRC_IDLE or RRC_INACTIVE or both. A report may be an MDT or other report.

Additional details regarding the above steps are now provided. There are optional examples. Step 1: This step may further comprise determining LBT category or type, COT, etc. The determining may be based on, e.g., an indication from a network node (LBT usage on a specific carrier frequency or in a frequency band), pre-defined operation type (LBT-based or non-LBT based) for a specific carrier frequency or frequency band, etc.

Step 2: The enhanced cell (re)selection may comprise any suitable combination of the aspects, embodiments and/or examples discussed herein, in particular, those discussed in points 1 to 20 above.

Methods in Radio Network Nodes: Network nodes may be configured to operate together with UEs, and may comprise features in accordance with an aspect, embodiment or example as discussed herein.

Generally, a network node may determine UE behaviour based on one or more predefined rules (e.g., the rules referred to in points 1 to 20 above) and adapts its operation accordingly. The network node may further adaptively configure its COT and one or more of its own or UE's LBT related parameters or thresholds (the LBT may be shared or non-shared and it may be network node initiated or UE initiated). The network node may also collect and use its LBT failures/success statistics for the adapting of its operation.

Examples of features/functions which may be provided by network nodes may comprise one or more of:

Selecting adaptively COT configuration and/or corresponding LBT category/type and/or one or more thresholds configured for the UEs cell (re)selection to increase the probability of UE completion the enhanced cell (re)selection procedure (i.e., to decrease the probability of UE failing the enhanced cell (re)selection procedure e.g., due to long time needed for the procedure). For example, higher threshold numbers and longer times may be configured when the number of LBR failures is high or above a threshold.

Configuring a first set of one or more parameters of the enhanced cell (re)selection when a first COT type and/or category is used, and configuring a second set of one or more parameters of the enhanced cell (re)selection when a second COT type and/or category is used. For example, less aggressive (i.e., more relaxed) thresholds may be configured for shared and/or longer COT. In another example, less aggressive (i.e., more relaxed) thresholds may be configured for non-shared and/or shorter COT.

Configuring the UE with a threshold (Hs) which is used by the UE when performing serving cell evaluation as described in example of UE embodiment. The characteristics of Hs described in the context of aspects of embodiments of the UE may also apply here.

Configuring the UE with a threshold (Hm) which is used by the UE when performing measurements subject to LBT, e.g., to decide whether to discard or restart any samples of measurements. The characteristics of Hm described in the context of aspects of embodiments of the UE may also apply here.

Configuring the UE with a threshold (He) which is used by the UE when evaluating cell2 for cell re-selection. The characteristics of He described in the context of aspects of embodiments of the UE may also apply here.

Configuring the UE with a threshold (Mn) which is used by the UE when determining the samples to include in filtering of the measurements, for example, as described above. The characteristics of Mn described in the context of aspects of embodiments of the UE may also apply here.

Configuring the UE with a threshold (Mp) which is used by the UE for deciding when to start measuring on neighbor cells, for example, as described above. The characteristics of Mp described in the context of aspects of embodiments of the UE may also apply here.

Configuring the UE with a threshold (Mq) which is used by the UE for deciding when to start measuring on neighbor cells, for example, as described above. The characteristics of Mq described in the context of aspects of embodiments of the UE may also apply here.

Configuring the UE with a threshold (Mr) which is used by the UE for deciding when to initiate the measurements on the neighbor cells of one or more non-serving carrier frequencies which the UE shall measure when it cannot do measurement due to LBT failure, for example, as described above. The characteristics of Mr described in the context of aspects of embodiments of the UE may also apply here.

Configuring the UE with the thresholds Mq and Mr, which are used by the UE for deciding when to initiate the measurements on the neighbor cells of the serving carrier and non-serving carrier respectively. The characteristics of Mq and Mr described in the context of aspects of embodiments of the UE may also apply here.

Configuring the UE with carriers (inter-frequency, inter-RAT) to measure which are associated with the thresholds (Mq, Mr, Mp) as described above.

Configuring the UE with the thresholds (X and N) which are used by the UE for evaluating the relaxed serving cell monitoring criteria when operating under LBT, for example, as described above.

Configuring the UE with the thresholds(SrxlevRef' and SSearchDeltaP') which are used by the UE for evaluating the relaxed neighbour cell monitoring criteria when operating under LBT, for example, as described above.

Configuring the UE with a threshold (Z and Z') which are used by the UE for evaluating the early termination criteria, for example, as described above.

In aspects of some embodiments, a network node may adapt its SMTC or DRS periodicity or DRX periodicity in IDLE or paging occasions in IDLE to facilitate UE performance in RRC_IDLE and RRC_INACTIVE. For example, the number and density of the signal occasions and/or DRX can be increased (e.g., by shortening periodicity and/or increasing the number of consecutive transmissions or the occasions' length) when the time for UE procedures in IDLE/INACTIVE tend to be too long due to LBT failures, e.g., T1>some threshold, T1−T0>some threshold, M>threshold, etc. The network node may determine poor UE performance in IDLE/INACTIVE due to LBT based on a message or indication from one or more UE which may comprise a report, indication, performance related parameters or statistics, MDT log (as also discussed above in the context of the UE).

Figure 4:
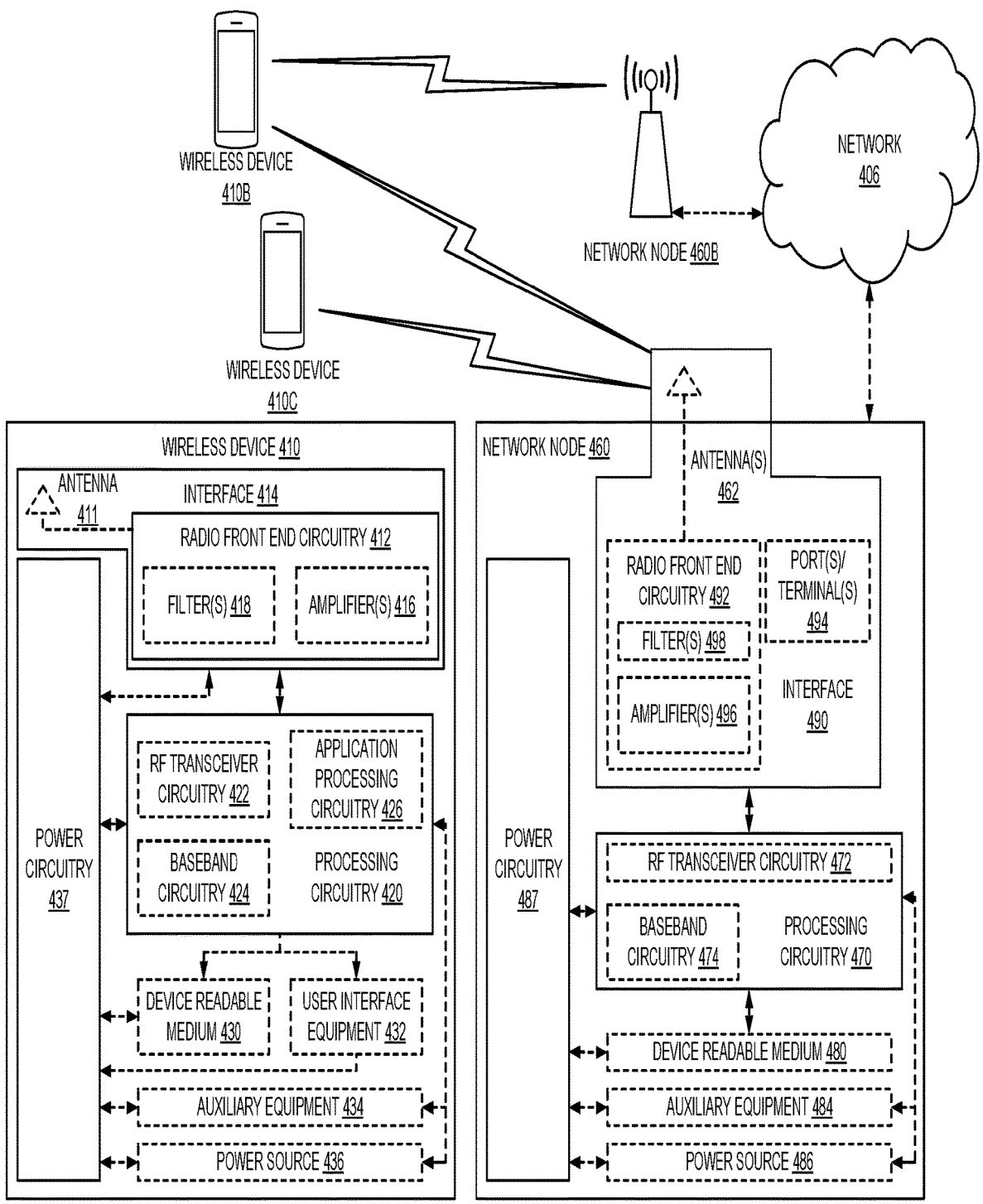
FIG. 4 illustrates a wireless network in accordance with some embodiments.

FIG. 4 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 406, network nodes 460 and 460b, and WDs 410, 410b, and 410c. One or more of network nodes 460 and 460b, and WDs 410, 410b, and 410c may be in accordance with an aspect of an embodiment described herein, or may implement methods as described herein. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks, packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, Operations Support System nodes, Self-Organizing Network nodes, positioning nodes (e.g., Evolved-Serving Mobile Location Center), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 460 includes processing circuitry 470, device readable medium 480, interface 490, auxiliary equipment 484, power source 486, power circuitry 487, and antenna 462. Although network node 460 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, Wideband Code Division Multiple Access, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 4 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. In particular, a WD may perform a cell selection method accounting for LBT requirements without direct human interaction. Examples of a WD include, but are not limited to, a smart phone, a mobile phone, a cell phone, a voice over IP phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment, a laptop-mounted equipment, a smart device, a wireless customer-premise equipment. a vehicle-mounted wireless terminal device, etc. A WD may support device-to-device (D2D) communication, for example by implementing a 3GPP standard for sidelink communication, vehicle-to-vehicle, vehicle-to-infrastructure, vehicle-to-everything, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410. The wireless technologies may be used for cell selection.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein. In particular, processing circuitry 420 may execute a method performed by a wireless device for cell selection accounting for LBT requirements as discussed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 5:
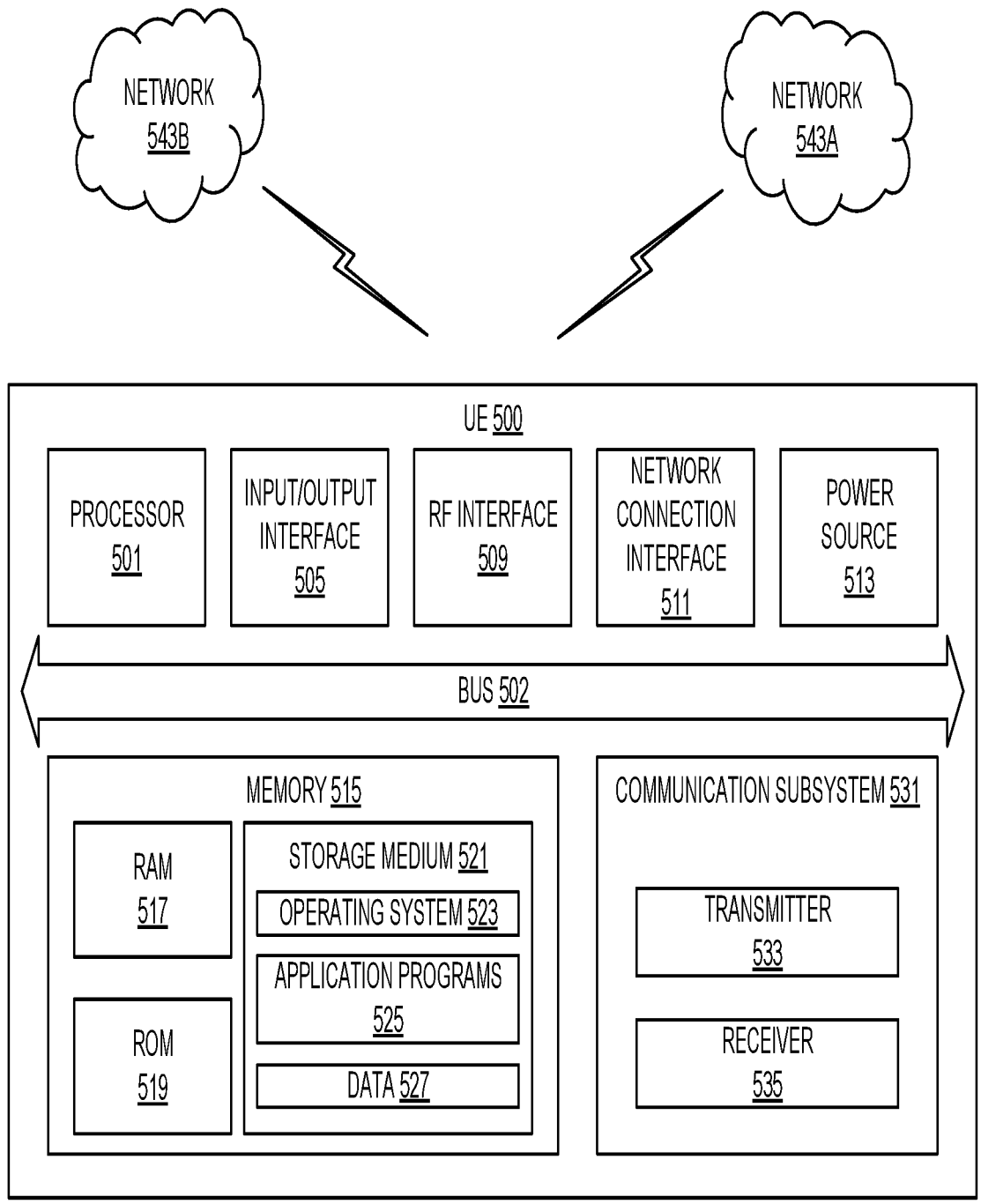
FIG. 5 illustrates a User Equipment (UE) in accordance with some embodiments.

FIG. 5 illustrates a User Equipment (UE) in accordance with some embodiments. FIG. 5 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 500 may be any UE identified by the 3rd Generation Partnership Project (3GPP), including a NB-IoT UE, a machine type communication (MTC) UE, and/or an enhanced MTC (eMTC) UE. UE 500, as illustrated in FIG. 5, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa. In particular, UE 500 may be configured to perform methods as discussed herein in low RRC activity states (e.g., idle state, inactive state).

In FIG. 5, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory, erasable programmable read-only memory, electrically erasable programmable read-only memory, magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks, floppy disk drive, flash memory, USB flash drive, external hard disk drive, thumb drive, pen drive, key drive, high-density digital versatile disc optical disc drive, internal hard disk drive, Blu-Ray optical disc drive, holographic digital data storage optical disc drive, external mini-dual in-line memory module (DIMM), synchronous dynamic random access memory (SDRAM), external micro-DIMM SDRAM, smartcard memory such as a subscriber identity module or a removable user identity module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 5, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 6:
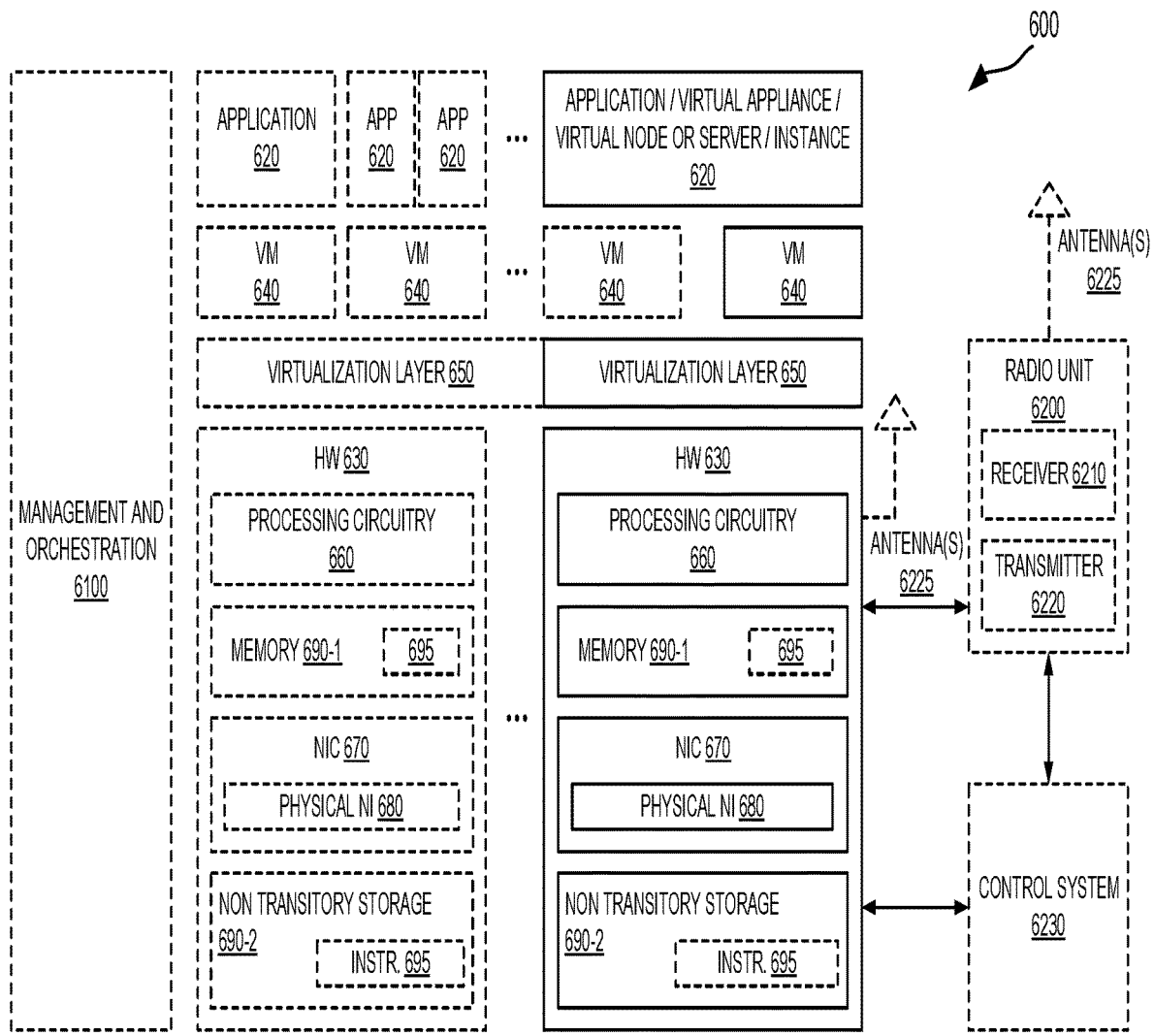
FIG. 6 illustrates a virtualization environment in accordance with some embodiments.

FIG. 6 illustrates a virtualization environment in accordance with some embodiments. FIG. 6 is a schematic block diagram illustrating a virtualization environment 600 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 600 hosted by one or more of hardware nodes 630. Further, in embodiments in which the virtual node is not a radio access node or does not require radio connectivity (e.g., a core network node), then the network node may be entirely virtualized.

The functions may be implemented by one or more applications 620 (which may alternatively be called software instances, virtual appliances, network functions, virtual nodes, virtual network functions, etc.) operative to implement some of the features, functions, and/or benefits of some of the embodiments disclosed herein. Applications 620 are run in virtualization environment 600 which provides hardware 630 comprising processing circuitry 660 and memory 690. Memory 690 contains instructions 695 executable by processing circuitry 660 whereby application 620 is operative to provide one or more of the features, benefits, and/or functions disclosed herein.

Virtualization environment 600, comprises general-purpose or special-purpose network hardware devices 630 comprising a set of one or more processors or processing circuitry 660, which may be commercial off-the-shelf processors, dedicated Application Specific Integrated Circuits (ASICs), or any other type of processing circuitry including digital or analog hardware components or special purpose processors. Each hardware device may comprise memory 690-1 which may be non-persistent memory for temporarily storing instructions 695 or software executed by processing circuitry 660. Each hardware device may comprise one or more network interface controllers 670, also known as network interface cards, which include physical network interface 680. Each hardware device may also include non-transitory, persistent, machine-readable storage media 690-2 having stored therein software 695 and/or instructions executable by processing circuitry 660. Software 695 may include any type of software including software for instantiating one or more virtualization layers 650 (also referred to as hypervisors), software to execute virtual machines 640 as well as software allowing it to execute functions, features and/or benefits described in relation with some embodiments described herein.

Virtual machines 640, comprise virtual processing, virtual memory, virtual networking or interface and virtual storage, and may be run by a corresponding virtualization layer 650 or hypervisor. Different embodiments of the instance of virtual appliance 620 may be implemented on one or more of virtual machines 640, and the implementations may be made in different ways.

During operation, processing circuitry 660 executes software 695 to instantiate the hypervisor or virtualization layer 650, which may sometimes be referred to as a virtual machine monitor. Virtualization layer 650 may present a virtual operating platform that appears like networking hardware to virtual machine 640.

As shown in FIG. 6, hardware 630 may be a standalone network node with generic or specific components. Hardware 630 may comprise antenna 6225 and may implement some functions via virtualization. Alternatively, hardware 630 may be part of a larger cluster of hardware (e.g., such as in a data center or customer premise equipment) where many hardware nodes work together and are managed via management and orchestration 6100, which, among others, oversees lifecycle management of applications 620.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 640 may be a software implementation of a physical machine that runs programs as if they were executing on a physical, non-virtualized machine. Each of virtual machines 640, and that part of hardware 630 that executes that virtual machine, be it hardware dedicated to that virtual machine and/or hardware shared by that virtual machine with others of the virtual machines 640, forms a separate virtual network elements.

Still in the context of NFV, Virtual Network Function is responsible for handling specific network functions that run in one or more virtual machines 640 on top of hardware networking infrastructure 630 and corresponds to application 620 in FIG. 6.

In some embodiments, one or more radio units 6200 that each include one or more transmitters 6220 and one or more receivers 6210 may be coupled to one or more antennas 6225. Radio units 6200 may communicate directly with hardware nodes 630 via one or more appropriate network interfaces and may be used in combination with the virtual components to provide a virtual node with radio capabilities, such as a radio access node or a base station.

In some embodiments, some signalling can be effected with the use of control system 6230 which may alternatively be used for communication between the hardware nodes 630 and radio units 6200.

Figure 7:
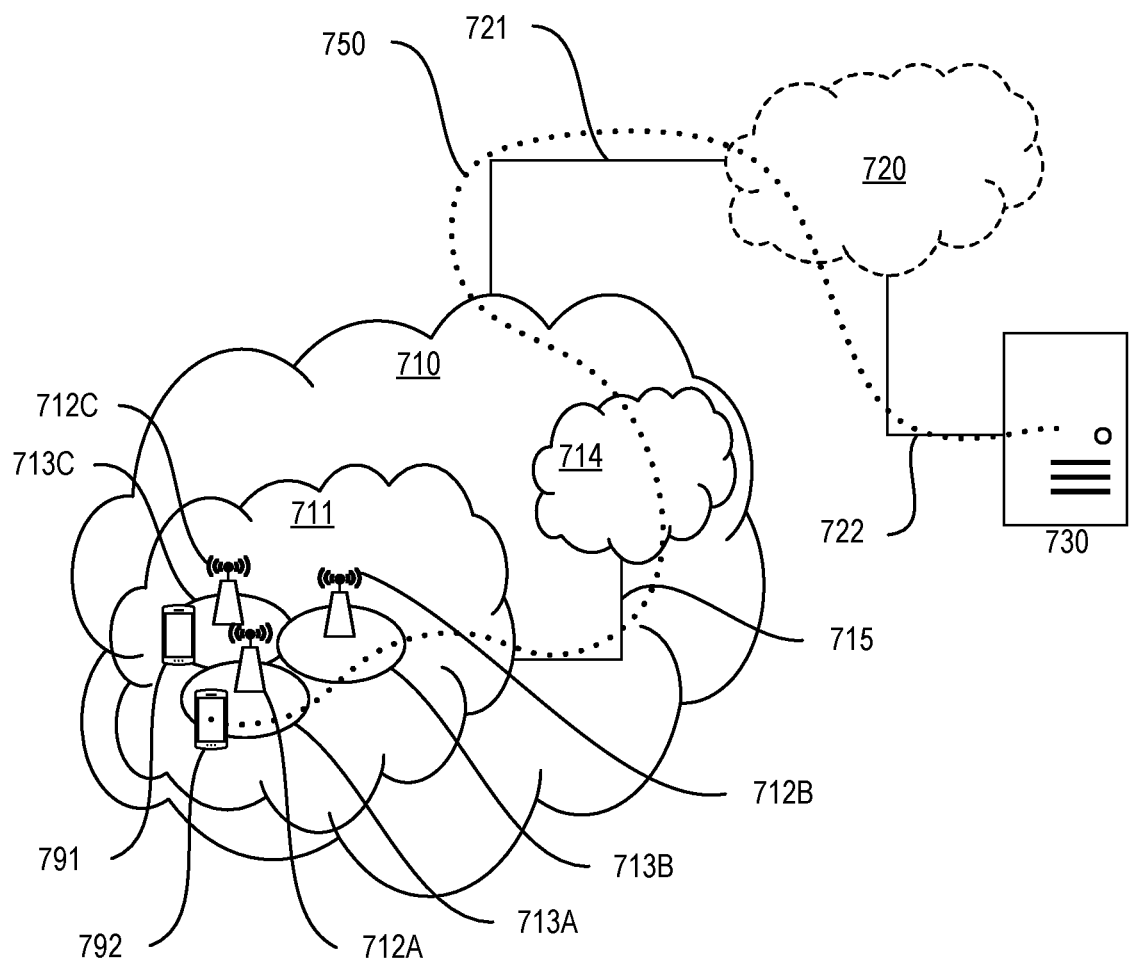
FIG. 7 illustrates a telecommunication network connected via an intermediate network to a host computer in accordance with some embodiments.

FIG. 7 illustrates a telecommunication network connected via an intermediate network to a host computer in accordance with some embodiments. With reference to FIG. 7, in accordance with an embodiment, a communication system includes telecommunication network 710, such as a 3GPP-type cellular network, which comprises access network 711, such as a radio access network, and core network 714. Access network 711 comprises a plurality of base stations 712a, 712b, 712c, such as NBs, eNBs, gNBs or other types of wireless access points, each defining a corresponding coverage area 713a, 713b, 713c. One or more of the base stations 712a, 712b, 712c may be in accordance with aspects of embodiments as defined herein. Each base station 712a, 712b, 712c is connectable to core network 714 over a wired or wireless connection 715. A first UE 791 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712. One or more of the UEs 791 and 792 may be in accordance with aspects of embodiments as defined herein.

Telecommunication network 710 is itself connected to host computer 730, which may be embodied in the hardware and/or software of a standalone server, a cloud-implemented server, a distributed server or as processing resources in a server farm. Host computer 730 may be under the ownership or control of a service provider, or may be operated by the service provider or on behalf of the service provider. Connections 721 and 722 between telecommunication network 710 and host computer 730 may extend directly from core network 714 to host computer 730 or may go via an optional intermediate network 720. Intermediate network 720 may be one of, or a combination of more than one of, a public, private or hosted network; intermediate network 720, if any, may be a backbone network or the Internet; in particular, intermediate network 720 may comprise two or more subnetworks (not shown).

The communication system of FIG. 7 as a whole enables connectivity between the connected UEs 791, 792 and host computer 730. The connectivity may be described as an over-the-top (OTT) connection 750. Host computer 730 and the connected UEs 791, 792 are configured to communicate data and/or signaling via OTT connection 750, using access network 711, core network 714, any intermediate network 720 and possible further infrastructure (not shown) as intermediaries. OTT connection 750 may be transparent in the sense that the participating communication devices through which OTT connection 750 passes are unaware of routing of uplink and downlink communications. For example, base station 712 may not or need not be informed about the past routing of an incoming downlink communication with data originating from host computer 730 to be forwarded (e.g., handed over) to a connected UE 791. Similarly, base station 712 need not be aware of the future routing of an outgoing uplink communication originating from the UE 791 towards the host computer 730.

Figure 8:
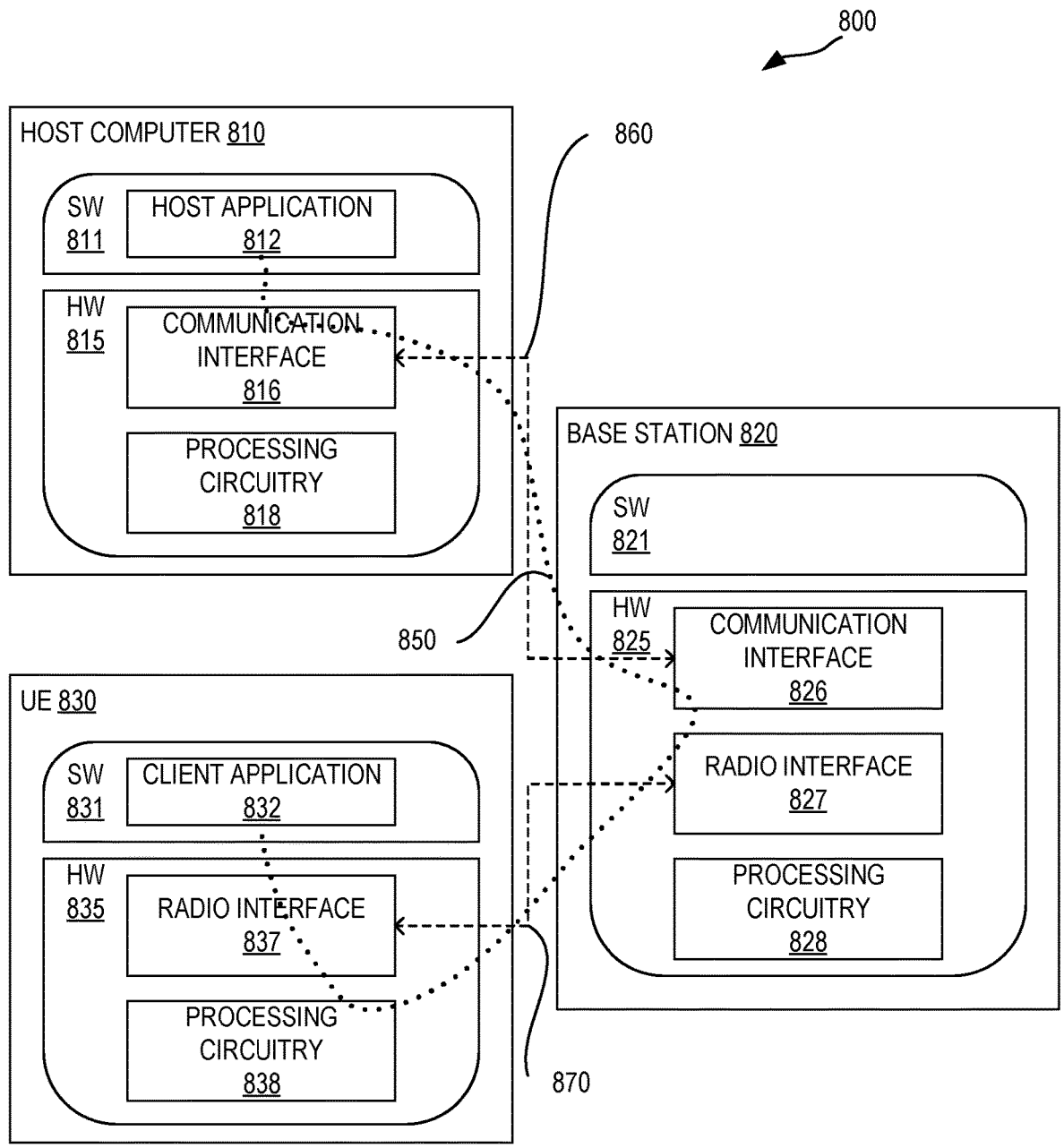
FIG. 8 illustrates a host computer communicating via a base station with a user equipment over a partially wireless connection in accordance with some embodiments.

FIG. 8 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 8. In communication system 800, host computer 810 comprises hardware 815 including communication interface 816 configured to set up and maintain a wired or wireless connection with an interface of a different communication device of communication system 800. Host computer 810 further comprises processing circuitry 818, which may have storage and/or processing capabilities. In particular, processing circuitry 818 may comprise one or more programmable processors, application-specific integrated circuits, field programmable gate arrays or combinations of these (not shown) adapted to execute instructions. Host computer 810 further comprises software 811, which is stored in or accessible by host computer 810 and executable by processing circuitry 818. Software 811 includes host application 812. Host application 812 may be operable to provide a service to a remote user, such as UE 830 connecting via OTT connection 850 terminating at UE 830 and host computer 810. In providing the service to the remote user, host application 812 may provide user data which is transmitted using OTT connection 850.

Communication system 800 further includes base station 820 provided in a telecommunication system and comprising hardware 825 enabling it to communicate with host computer 810 and with UE 830. Hardware 825 may include communication interface 826 for setting up and maintaining a wired or wireless connection with an interface of a different communication device of communication system 800, as well as radio interface 827 for setting up and maintaining at least wireless connection 870 with UE 830 located in a coverage area (not shown in FIG. 8) served by base station 820. Communication interface 826 may be configured to facilitate connection 860 to host computer 810. Connection 860 may be direct or it may pass through a core network (not shown in FIG. 8) of the telecommunication system and/or through one or more intermediate networks outside the telecommunication system. In the embodiment shown, hardware 825 of base station 820 further includes processing circuitry 828, which may comprise one or more programmable processors, application-specific integrated circuits, field programmable gate arrays or combinations of these (not shown) adapted to execute instructions. Base station 820 further has software 821 stored internally or accessible via an external connection.

Communication system 800 further includes UE 830 already referred to. Its hardware 835 may include radio interface 837 configured to set up and maintain wireless connection 870 with a base station serving a coverage area in which UE 830 is currently located. Hardware 835 of UE 830 further includes processing circuitry 838, which may comprise one or more programmable processors, application-specific integrated circuits, field programmable gate arrays or combinations of these (not shown) adapted to execute instructions. UE 830 further comprises software 831, which is stored in or accessible by UE 830 and executable by processing circuitry 838. Software 831 includes client application 832. Client application 832 may be operable to provide a service to a human or non-human user via UE 830, with the support of host computer 810. In host computer 810, an executing host application 812 may communicate with the executing client application 832 via OTT connection 850 terminating at UE 830 and host computer 810. In providing the service to the user, client application 832 may receive request data from host application 812 and provide user data in response to the request data. OTT connection 850 may transfer both the request data and the user data. Client application 832 may interact with the user to generate the user data that it provides.

It is noted that host computer 810, base station 820 and UE 830 illustrated in FIG. 8 may be similar or identical to host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, OTT connection 850 has been drawn abstractly to illustrate the communication between host computer 810 and UE 830 via base station 820, without explicit reference to any intermediary devices and the precise routing of messages via these devices. Network infrastructure may determine the routing, which it may be configured to hide from UE 830 or from the service provider operating host computer 810, or both. While OTT connection 850 is active, the network infrastructure may further take decisions by which it dynamically changes the routing (e.g., on the basis of load balancing consideration or reconfiguration of the network).

Wireless connection 870 between UE 830 and base station 820 is in accordance with the teachings of the embodiments described throughout this disclosure. One or more of the various embodiments improve the performance of OTT services provided to UE 830 using OTT connection 850, in which wireless connection 870 forms the last segment. More precisely, the teachings of these embodiments may improve the connection performance of UEs in the presence of LBT and thereby provide benefits such as reduced user waiting times and improved cell selection.

A measurement procedure may be provided for the purpose of monitoring data rate, latency and other factors on which the one or more embodiments improve. There may further be an optional network functionality for reconfiguring OTT connection 850 between host computer 810 and UE 830, in response to variations in the measurement results. The measurement procedure and/or the network functionality for reconfiguring OTT connection 850 may be implemented in software 811 and hardware 815 of host computer 810 or in software 831 and hardware 835 of UE 830, or both. In embodiments, sensors (not shown) may be deployed in or in association with communication devices through which OTT connection 850 passes; the sensors may participate in the measurement procedure by supplying values of the monitored quantities exemplified above, or supplying values of other physical quantities from which software 811, 831 may compute or estimate the monitored quantities. The reconfiguring of OTT connection 850 may include message format, retransmission settings, preferred routing etc.; the reconfiguring need not affect base station 820, and it may be unknown or imperceptible to base station 820. Such procedures and functionalities may be known and practiced in the art. In certain embodiments, measurements may involve proprietary UE signaling facilitating host computer 810's measurements of throughput, propagation times, latency and the like. The measurements may be implemented in that software 811 and 831 causes messages to be transmitted, in particular empty or 'dummy' messages, using OTT connection 850 while it monitors propagation times, errors etc.

FIG. 9 illustrates methods implemented in a communication system including a host computer, a base station and a user equipment in accordance with some embodiments. FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

FIG. 10 illustrates methods implemented in a communication system including a host computer, a base station and a user equipment in accordance with some embodiments. FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figures 11, 12:
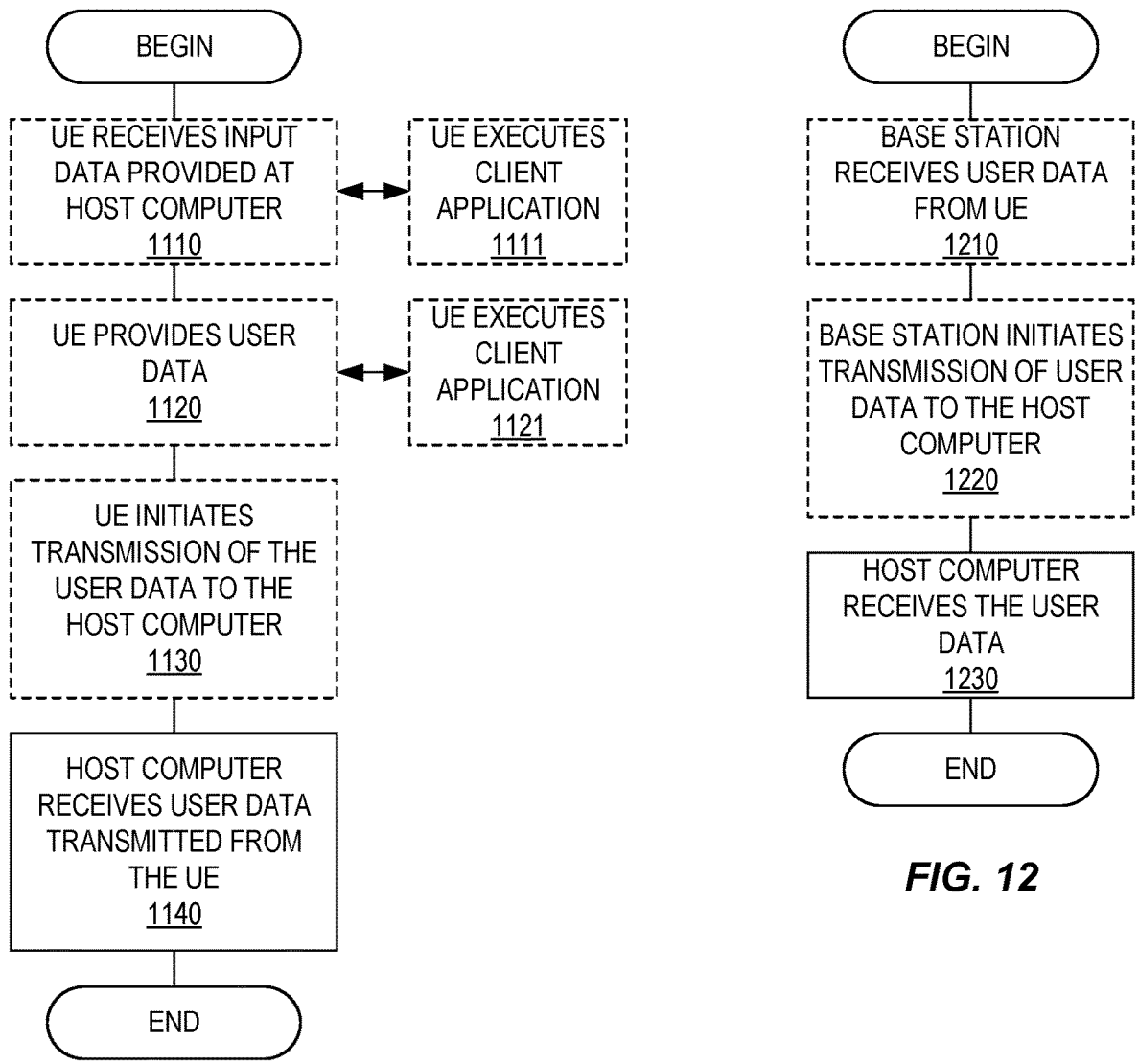
FIG. 11 illustrates methods implemented in a communication system including a host computer, a base station and a user equipment in accordance with some embodiments.
FIG. 12 illustrates methods implemented in a communication system including a host computer, a base station and a user equipment in accordance with some embodiments.

FIG. 11 illustrates methods implemented in a communication system including a host computer, a base station and a user equipment in accordance with some embodiments. FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

FIG. 12 illustrates methods implemented in a communication system including a host computer, a base station and a user equipment in accordance with some embodiments. FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

Figure 13:
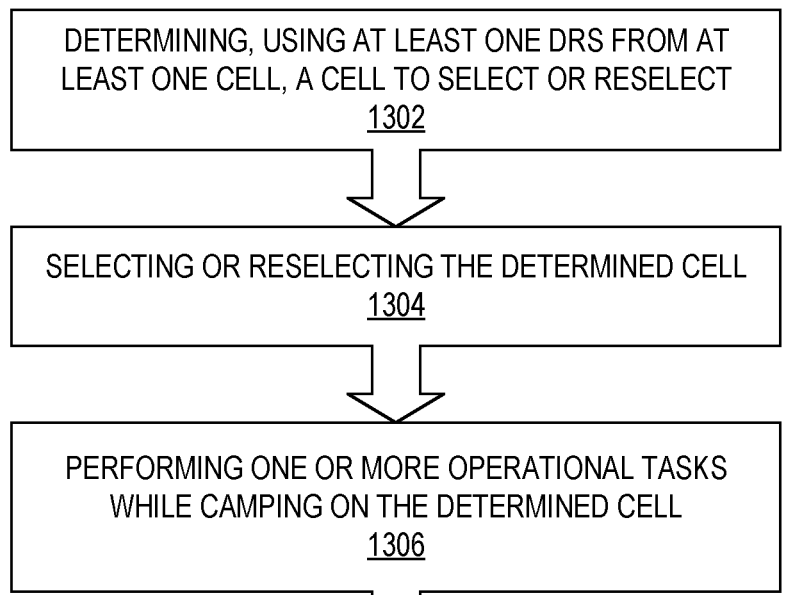
FIG. 13 depicts a method performed by a UE for cell selection accounting for LBT requirements in accordance with particular embodiments.

FIG. 13 depicts a method performed by a UE for cell selection accounting for LBT requirements in accordance with particular embodiments; the method begins at step 1302 with determining, using at least one DRS from at least one cell, a cell to select or reselect. The may be performed while the UE is in a low RRC activity state (e.g., idle state, inactive state). The determination may comprise taking measurements of one or more cells. The method may further comprise, at step 1304, selecting or reselecting the determined cell. The method may further comprise, at step 1306, performing one or more operational tasks while camping on the determined cell. The operational tasks may comprise one or more of: network registration; cell reselection to another cell; performing and logging MDT measurements; update procedures; and serving cell evaluation.

Figure 14:
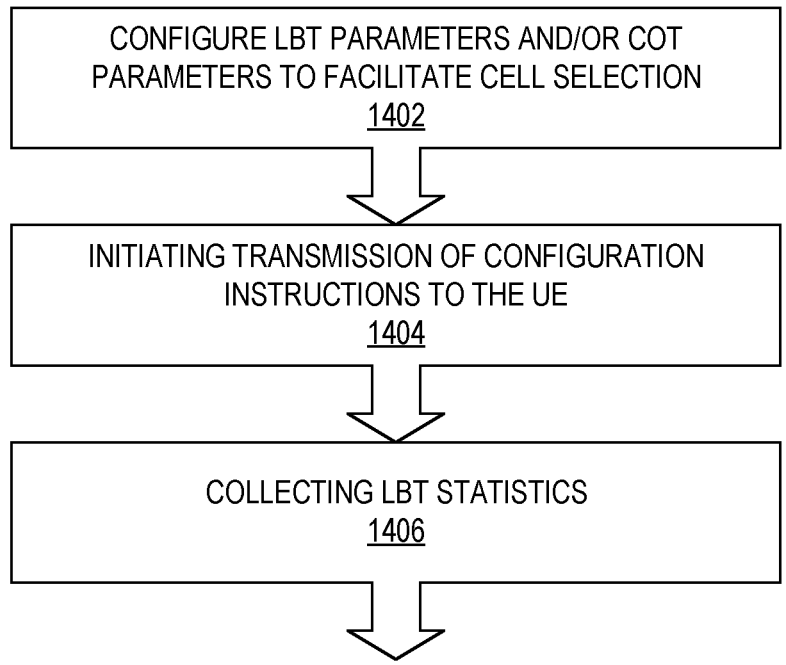
FIG. 14 depicts a method performed by a network node for facilitating cell selection accounting for LBT requirements in accordance with particular embodiments.

FIG. 14 depicts a method performed by a network node for facilitating cell selection accounting for LBT requirements in accordance with particular embodiments. The method begins at step 1402 with a network node configuring LBT parameters and/or COT parameters to facilitate cell selection by a UE. The LBT parameters and/or COT parameters may be configured based on UE requirements. The method may further comprise, at step 1404, initiating transmission of configuration instructions to the UE. The method may further comprise, at step 1406, collecting LBT statistics. The collected LBT statistics may be used to adapt the network node operation to further facilitate UE cell selection.

Figure 15:
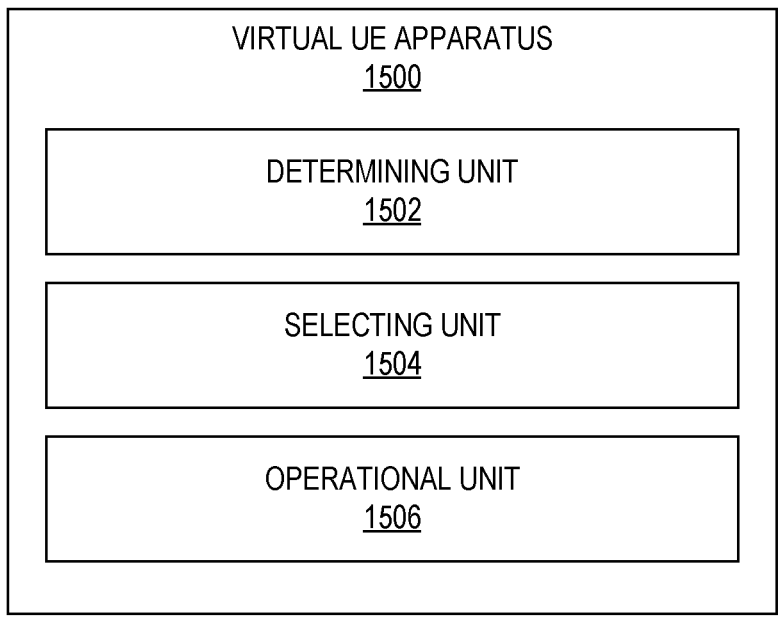
FIG. 15 depicts a virtual UE apparatus in accordance with particular embodiments.

As illustrated in FIG. 15, virtual UE apparatus 1500 includes determining unit 1502, selecting unit 1504, and operational unit 1506.

FIG. 15 illustrates a virtualization apparatus in accordance with some embodiments. FIG. 15 illustrates a schematic block diagram of a virtual UE apparatus 1500 in a wireless network (for example, the wireless network shown in FIG. 4). The apparatus may be implemented in one or more wireless devices (e.g., forming part of the network 406 shown in FIG. 4). Apparatus 1500 is operable to carry out the example method described with reference to FIG. 13 and possibly any other processes or methods disclosed herein. It is also to be understood that the method of FIG. 13 is not necessarily carried out solely by apparatus 1500. At least some operations of the method can be performed by one or more other entities. As illustrated in FIG. 15, virtual UE apparatus 1500 includes determining unit 1502, selecting unit 1504 and operational unit 1506.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining unit 1502, to determine a cell to select or reselect, selecting unit 1504 to select the determined cell, operational unit 1506 to perform one or more operational tasks while camping on the determined cell, and any other suitable units of apparatus 1500 to perform corresponding functions according one or more embodiments of the present disclosure.

Figure 16:
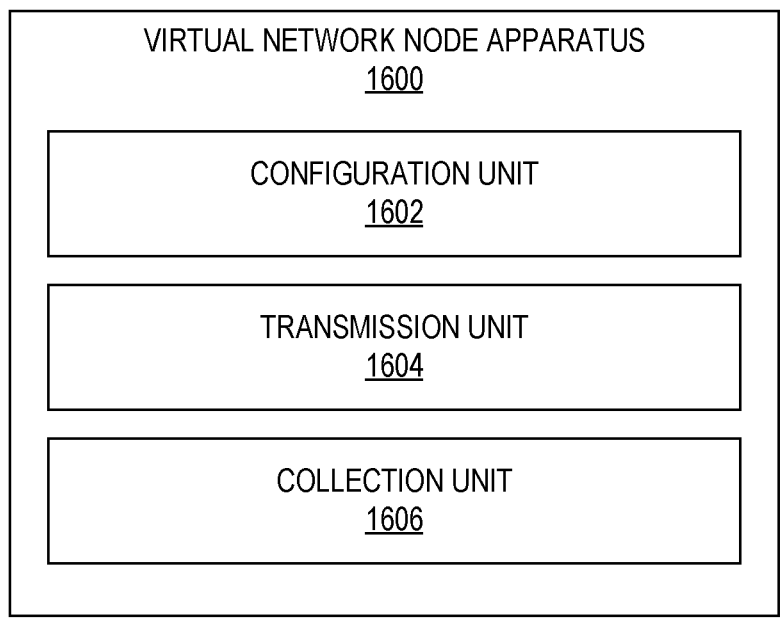
FIG. 16 depicts a virtual network node apparatus in accordance with particular embodiments.

As illustrated in FIG. 16, virtual network node apparatus 1600 includes configuration unit 1602, transmission unit 1604, and collection unit 1606. FIG. 16 illustrates a schematic block diagram of a virtual network node apparatus 1600 in a wireless network (for example, network node 460 in the wireless network shown in FIG. 4. The apparatus may be implemented in one or more network nodes (e.g., forming part of the network 406 shown in FIG. 4). Apparatus 1600 is operable to carry out the example method described with reference to FIG. 14 and possibly any other processes or methods disclosed herein. It is also to be understood that the method of FIG. 14 is not necessarily carried out solely by apparatus 1600. At least some operations of the method can be performed by one or more other entities. As illustrated in FIG. 16, virtual network node apparatus 1600 includes configuration unit 1602, transmission unit 1604 and collection unit 1606.

Virtual network node apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the configuration unit 1602 to configure LBT parameters and/or COT parameters to facilitate cell selection, to cause the transmission unit 1604 to initiate transmission of configuration instructions to the UE, and/or to cause the collection unit 1606 to collect LBT statistics.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for cell selection or reselection accounting for LBT requirements, the method comprising: determining in presence of LBT, using at least one DRS from at least one cell, a cell to select or reselect; and selecting or reselecting the determined cell.

Embodiment 2: The method of embodiment 1 wherein, in the step of determining, an extended duration for performing the determining is used if LBT is in use, the extended duration being extended relative to a duration used where LBT is not in use.

Embodiment 3: The method of embodiment 2, wherein the extended duration may take into account one or more of: a time required to evaluate whether a newly detectable cell meets selection criteria; a time required to evaluate that a cell that has been already detected but not selected has met the selection criteria; and a measurement periodicity of already identified cells.

Embodiment 4: The method of any of embodiments 2 and 3 wherein the extended duration is based on one or more of: LBT parameters; COT parameters; DRS properties and DRX cycle lengths.

Embodiment 5: The method of any preceding embodiment, wherein the determining further comprises measuring a signal level of a current serving cell and evaluating cell selection criteria for the serving cell during a plurality of DRX cycles.

Embodiment 6: The method of embodiment 5 wherein the determining further comprises measuring the number of DRS instances wherein the current serving cell is not available against a missed DRS threshold, wherein: if the number of instances wherein the current serving cell is not available is less than the missed DRS threshold, the determination is performed using existing measurements of the current serving cell; or if the number of instances wherein the current serving cell is not available equal to or greater than the missed DRS threshold, the determination is restarted using new measurements of the current serving cell.

Embodiment 7: The method of any preceding embodiment wherein the step of determining further comprises, when evaluating the selection of a cell using LBT, detecting the presence of DRS prior to performing a measurement based on DRS.

Embodiment 8: The method of any preceding embodiment wherein the step of determining comprises measuring and evaluating a target cell, and wherein the time to measure and evaluate the target cell is a function of measurement and evaluation criteria, including at least one of: a number of DRS occasions necessary to detect the presence of DRS; a number of samples necessary to perform a measurement and evaluate based on the detected DRS; a number of configured DRS occasions the target cell is not available for detection; a number of configured DRS occasions the detected target cell is not available for measurement; and a number of configured DRS occasions the target cell is not available for evaluation.

Embodiment 9: The method of embodiment 8 wherein, if the value of a measurement and evaluation criteria exceeds a certain threshold, the evaluation of a target cell is restarted.

Embodiment 10: The method of any preceding embodiment wherein the step of determining comprises measuring a signal from a cell on two instances, and determining whether the cell should be selected or reselected using a combination of the measurements from the two instances.

Embodiment 11: The method of embodiment 10, wherein the two measurement instances are separated by at least a first number of DRX cycles, optionally wherein the two measurement instances are separated by DRS missed due to LBT failure.

Embodiment 12: The method of any of embodiments 10 and 11, wherein the two measurement instances are separated by less than a second number of DRX cycles.

Embodiment 13: The method of any preceding embodiment wherein the step of determining comprises evaluating whether a current serving cell satisfies a cell selection criteria and, if the current serving cell does not satisfy the cell selection criteria, initiating measurements of all neighbor cells indicated by the current serving cell.

Embodiment 14: The method of embodiment 13, wherein the measurements of all neighbor cells are initiated regardless of measurement rules limiting UE measurement activities.

Embodiment 15: The method of any of embodiments 13 and 14, wherein the current serving cell is evaluated not to satisfy the cell selection criteria because the UE is unable to perform measurements of the current serving cell during a threshold number of consecutive DRX cycles.

Embodiment 16: The method of any preceding embodiment wherein the step of determining comprises evaluating whether a signal from a current serving cell satisfies a condition and, if the signal is determined to satisfy the condition, determining that the current serving cell should be reselected without performing further measurements.

Embodiment 17: The method of any preceding embodiment wherein the step of determining comprises detecting DRS, and the detection of DRS from a given cell is adapted to a known LBT type and/or COT type of the given cell.

Embodiment 18: The method of any preceding embodiment, wherein the UE obtains and stores information on cells.

Embodiment 19: The method of embodiment 18, wherein the information comprises one or more of: whether a cell uses LBT; DRS availability statistics, and DRS configuration information.

Embodiment 20: The method of any of embodiments 18 and 19, wherein the information on cells may be used by the UE in the step of determining and/or wherein the information on cells may be provided by the UE to the network.

Embodiment 21: The method of any preceding embodiment, wherein the UE is configured to operate using a relaxed serving cell monitoring mode, such that the frequency with which the steps of determining and selecting are performed is reduced if the UE satisfies quality criteria.

Embodiment 22: The method of any preceding embodiment, wherein the UE is configured to operate using a relaxed neighboring cell monitoring mode, such that the quality of connection with neighbor cells is measured if the UE does not satisfy further quality criteria.

Embodiment 23: The method of any preceding embodiment, wherein the UE is configured to operate using an early termination of control channel monitoring mode, such that the UE stops attempting to receive or decode a channel when the estimated signal quality for the channel falls below an estimated signal quality threshold.

Embodiment 24: The method of any preceding embodiment, wherein the cell selection or reselection is intra-frequency or inter-frequency and/or where the cell selection or reselection is intra-RAT or inter-RAT.

Embodiment 25: The method of any preceding embodiment, wherein the method is performed while the UE is in a low RRC state.

Embodiment 26: The method of any preceding embodiment further comprising, following the selection or reselection of the determined cell, a step of performing one or more operational tasks while camping on the selected or reselected cell.

Embodiment 27: The method of embodiment 26, wherein the operational tasks comprise one or more of: network registration; cell reselection to another cell; performing and logging MDT measurements; update procedures; and serving cell evaluation.

Embodiment 28: The method of any of embodiments 26 and 27 further comprising, following the selection or reselection of the determined cell, logging one or more statistics related to UE operation.

Embodiment 29: The method of embodiment 28, further comprising reporting the logged statistics to the network, wherein the logged statistics are reported immediately, or wherein the logged statistics are reported according to a reporting schedule.

Embodiment 30: The method of any of the previous embodiments, further comprising: providing user data; and forwarding the user data to a host computer via the transmission to the base station.

Group B Embodiments

Embodiment 31: A method performed by a base station for facilitating cell selection accounting for LBT requirements, the method comprising: configuring LBT parameters and/or COT parameters to facilitate cell selection by a wireless device.

Embodiment 32: The method of embodiment 31, wherein the LBT parameters and/or COT parameters are configured based on wireless device requirements.

Embodiment 33: The method of any of embodiments 31 and 32, further comprising sending configuration instructions to the wireless device.

Embodiment 34: The method of any of embodiments 31 to 33, further comprising collecting LBT statistics.

Embodiment 35: The method of embodiment 34, wherein the collected LBT statistics are used to adapt the base station operation.

Embodiment 36: The method of any of embodiments 31 to 35, wherein the base station adapts at least one of DMTC, DRS and DRX periodicity to facilitate cell selection by the wireless device.

Embodiment 37: The method of any of the previous embodiments, further comprising: obtaining user data; and forwarding the user data to a host computer or a wireless device.

Group C Embodiments

Embodiment 38: A wireless device for cell selection accounting for LBT requirements, the wireless device comprising: processing circuitry configured to perform any of the steps of any of the Group A embodiments; and power supply circuitry configured to supply power to the wireless device.

Embodiment 39: A base station for facilitating cell selection accounting for LBT requirements, the base station comprising: processing circuitry configured to perform any of the steps of any of the Group B embodiments; power supply circuitry configured to supply power to the base station.

Embodiment 40: A user equipment (UE) for cell selection accounting for LBT requirements, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 41: A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Embodiment 42: The communication system of the previous embodiment further including the base station.

Embodiment 43: The communication system of the previous 2 embodiments, further including the UE, wherein the UE is configured to communicate with the base station.

Embodiment 44: The communication system of the previous 3 embodiments, wherein: the processing circuitry of the host computer is configured to execute a host application, thereby providing the user data; and the UE comprises processing circuitry configured to execute a client application associated with the host application.

Embodiment 45: A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Embodiment 46: The method of the previous embodiment, further comprising, at the base station, transmitting the user data.

Embodiment 47: The method of the previous 2 embodiments, wherein the user data is provided at the host computer by executing a host application, the method further comprising, at the UE, executing a client application associated with the host application.

Embodiment 48: A user equipment (UE) configured to communicate with a base station, the UE comprising a radio interface and processing circuitry configured to perform the method of the previous 3 embodiments.

Embodiment 49: A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Embodiment 50: The communication system of the previous embodiment, wherein the cellular network further includes a base station configured to communicate with the UE.

Embodiment 51: The communication system of the previous 2 embodiments, wherein: the processing circuitry of the host computer is configured to execute a host application, thereby providing the user data; and the UE's processing circuitry is configured to execute a client application associated with the host application.

Embodiment 52: A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Embodiment 53: The method of the previous embodiment, further comprising at the UE, receiving the user data from the base station. Embodiment 54: A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Embodiment 55: The communication system of the previous embodiment, further including the UE.

Embodiment 56: The communication system of the previous 2 embodiments, further including the base station, wherein the base station comprises a radio interface configured to communicate with the UE and a communication interface configured to forward to the host computer the user data carried by a transmission from the UE to the base station.

Embodiment 57: The communication system of the previous 3 embodiments, wherein: the processing circuitry of the host computer is configured to execute a host application; and the UE's processing circuitry is configured to execute a client application associated with the host application, thereby providing the user data.

Embodiment 58: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 59: A method implemented in a communication system including a host computer, a base station and a user equipment (UE), the method comprising: at the host computer, receiving user data transmitted to the base station from the UE, wherein the UE performs any of the steps of any of the Group A embodiments.

Embodiment 60: The method of the previous embodiment, further comprising, at the UE, providing the user data to the base station.

Embodiment 61: The method of the previous 2 embodiments, further comprising: at the UE, executing a client application, thereby providing the user data to be transmitted; and at the host computer, executing a host application associated with the client application.

Embodiment 62: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 63: A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment 64: The communication system of the previous embodiment further including the base station.

Embodiment 65: The communication system of the previous 2 embodiments, further including the UE, wherein the UE is configured to communicate with the base station.

Embodiment 66: The communication system of the previous 3 embodiments, wherein: the processing circuitry of the host computer is configured to execute a host application; the UE is configured to execute a client application associated with the host application, thereby providing the user data to be received by the host computer.

Embodiment 67: A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Embodiment 68: The method of the previous embodiment, further comprising at the base station, receiving the user data from the UE.

The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AC Alternating Current
AF Application Function
AMF Access and Mobility Function
AN Access Network
AP Access Point
ASIC Application Specific Integrated Circuit
AUSF Authentication Server Function
BS Base Station
BSC Base Station Controller
CCA Clear Channel Assessment
CD Compact Disk
CM Connection Management
CORESET Control Reference Set
COT Channel Occupancy Time
CPU Central Processing Unit
CRS Channel Reference Signal
CSMA Carrier Sense Multiple Access
D2D Device-to-Device
DAS Distributed Antenna System
DC Direct Current
DIMM Dual In-Line Memory Module
DMTC Discovery Measurement Timing Configuration
DN Data Network
DRS Discovery Reference Signal
DSP Digital Signal Processor
DVD Digital Video Disc
eMTC Enhanced Machine Type Communication
eNB Enhanced or Evolved Node B
EPS Evolved Packet System
FR Frequency Report
gNB New Radio Base Station
gNB-DU New Radio Base Station Distributed Unit
GPS Global Positioning System
GSM Global System for Mobile Communications
HSS Home Subscriber Server
IoT Internet of Things
IP Internet Protocol
LAA License Assisted Access
LAN Local Area Network
LBT Listen Before Talk
LTE Long Term Evolution
M2M Machine-to-Machine
MCOT Maximum Channel Occupancy Time
MDT Minimization of Drive Test
MME Mobility Management Entity
MSR Multi-Standard Radio
MTC Machine Type Communication
NAS Non-Access Stratum
NEF Network Exposure Function
NF Network Function
NFV Network Function Virtualization
NG Next Generation
NR New Radio
NRF Network Function Repository Function
NR-U New Radio Unlicensed
NSSF Network Slice Selection Function
OTT Over-the-Top
PC Personal Computer
PCF Policy Control Function
PDCCH Physical Downlink Control Channel
P-GW Packet Data Network Gateway
PLMN Public Land Mobile Network
P-RNTI Paging Radio Network Temporary Identifier
PSS Primary Synchronization Signal
QoS Quality of Service
RAM Random Access Memory
RAN Radio Access Network
RAT Radio Access Technology
RF Radio Frequency
RMSI Remaining Minimum System Information
RNC Radio Network Controller
ROM Read Only Memory
RRH Remote Radio Head
RRU Remote Radio Unit
RSRP Reference Signal Received Power
RSRQ Reference Signal Received Quality
RTT Round Trip Time
SCEF Service Capability Exposure Function
SCell Secondary Cell
SDRAM Synchronous Dynamic Random Access Memory
SIB System Information Block
SMF Session Management Function
SMTC SSB-based Measurement Timing Configuration
SOC System on a Chip
SS Synchronization Signal
SSB Synchronization Signal Block
SSF Short Subframe
SSS Secondary Synchronization Signal
sTTI Short Transmission Time Interval
TRP Transmission Reception Point
TTI Transmission Time Interval
UDM Unified Data Management
UE User Equipment
UMTS Universal Mobile Telecommunications System
UPF User Plane Function
WAN Wide Area Network
WiMax Worldwide Interoperability for Microwave Access Those skilled in the art will recognize improvements and modifications to the embodiments of the present disclosure. All such improvements and modifications are considered within the scope of the concepts disclosed herein.

The invention claimed is:

1. A method performed by a wireless device for cell selection or cell re-selection accounting for Clear Channel Assessment, CCA, requirements, the method comprising:

determining a measurement period in a serving cell for the cell selection or cell re-selection (T1), wherein the measurement period is determined based on a number of consecutive Discontinuous Reception, DRX, cycles;

determining the cell selection time (T1) is used if CCA is in use, the cell selection time (T1) being extended relative to a duration used where CCA is not in use, determining the cell selection time (T1) being based on one or more of: CCA parameters; Channel Occupancy Time, COT, parameters; and Discovery Reference Signal, DRS, properties;

determining a number of measurement occasions configured with a DRS in the serving cell during T1;

determining availability of the DRS at the measurement occasions;

performing measurement based on availability of the DRS at the measurement occasions during T1, the measurement during the cell selection time (T1) taking into account one or more of:

a time required to evaluate whether a newly detectable cell meets selection criteria being a function of, or proportional to, a number of DRS occasions necessary to detect the presence of DRS and a number of configured DRS occasions in the target cell not available;

a time required to evaluate that a cell that has already been detected but not selected has met the selection criteria being a function of, or proportional to, a number of DRS occasions necessary to detect the presence of DRS, a number of samples necessary to perform a measurement and evaluate based on the detected DRS and a number of configured DRS occasions in the target cell not available; and a measurement periodicity of already identified cells; and determining whether to perform the cell selection or the cell re-selection based on the measurement during cell selection time (T1).

2. The method of claim 1 wherein determining the measurement period further comprises:
determining a number of instances of DRX cycles in which the DRS of a current serving cell is not available to the wireless device.

3. The method of claim 1 wherein determining the measurement period further comprises:
determining a threshold for the number of instances of DRX cycles where the DRS of the current serving cell is not available at the wireless device.

4. The method of claim 2, wherein:
if a number of instances wherein the DRS of the current serving cell is not available is equal to or greater than the threshold for the number of instances of DRX cycles, the wireless device restarts the measurements by using new measurements of the current serving cell.

5. The method of claim 1 wherein a number of configured DRS occasions in a target cell not available during T1 is due to absence of a necessary radio signal.

6. The method of claim 1 wherein performing the cell selection comprises selecting a different cell than the current serving cell.

7. The method of claim 1 wherein performing the cell selection comprises:
measuring a signal from a cell on at least two instances, and determining whether the cell should be selected or reselected using a combination of the measurements from the two instances;
wherein the at least two measurement instances are separated by at least a first number of DRX cycles and the at least two measurement instances are separated by less than a second number of DRX cycles.

8. The method of claim 1, further comprising:
measuring a signal level of the current serving cell and evaluating the cell selection criteria for the serving cell during a plurality of DRX cycles.

9. The method of claim 1, further comprising evaluating whether the current serving cell satisfies the cell selection criteria and, if the current serving cell does not satisfy the cell selection criteria, initiating measurements of all neighbor cells indicated by the current serving cell.

10. The method of claim 9, wherein the measurements of all neighbor cells are initiated regardless of measurement rules limiting wireless device measurement activities.

11. The method of claim 9, wherein the current serving cell is evaluated not to satisfy the cell selection criteria because the wireless device is unable to perform measurements of the current serving cell during the threshold number of consecutive DRX cycles.

12. The method of claim 11, further comprising evaluating whether a signal from the current serving cell satisfies a condition and, if the signal is determined to satisfy the condition, determining that the current serving cell should be selected without performing further measurements.

13. The method of claim 1 wherein performing the cell selection or cell reselection comprises detecting the DRS, and the detection of the DRS from the serving cell or a neighboring cell is adapted to a known CCA type and/or COT type of the cell.

14. The method of claim 1, wherein the wireless device obtains and stores information of the serving cell or neighboring cells.

15. The method of claim 14, wherein the information comprises one or more of: whether a cell uses CCA; DRS availability statistics, and DRS configuration information.

16. The method of claim 14, wherein the information of the serving cell or neighboring cells may be used by the wireless device in performing the cell selection and/or wherein the information of the serving cell or neighboring cells may be provided by the wireless device to the network.

17. The method of claim 1, wherein the wireless device is configured to operate using a relaxed serving cell monitoring mode, such that a frequency with which the wireless device performs the cell selection or the cell re-selection is reduced if the wireless device satisfies quality criteria.

18. The method of claim 1, wherein the wireless device is configured to operate using a relaxed neighboring cell monitoring mode, if criteria for entering the relaxed neighboring cell monitoring mode is satisfied.

19. The method of claim 1, wherein the wireless device is configured to operate using an early termination of a control channel monitoring mode, such that the wireless device stops attempting to receive or decode a channel when an estimated signal quality for the channel falls below a threshold.

20. The method of claim 1, wherein the cell selection is intra-frequency or inter-frequency and/or where the cell selection is intra-Radio Access Technology, RAT, or inter-RAT.

21. The method of claim 1, wherein the method is performed while the wireless device is in a low Radio Resource Control, RRC, state.

22. The method of claim 1 further comprising:
following the selection of the determined cell, performing one or more operational tasks while camping on the selected cell.

23. The method of claim 22, wherein the operational tasks comprise one or more of: network registration; cell reselection to another cell; performing and logging Minimization of Drive Test, MDT, measurements; update procedures; and serving cell evaluation.

24. The method of claim 22 further comprising:
following the selection of the determined cell, logging one or more statistics related to UE operation.

25. The method of claim 24, further comprising:
reporting the logged statistics to the network, wherein the logged statistics are reported immediately, or wherein the logged statistics are reported according to a reporting schedule.

26. The method of claim 1 wherein cell selection criterion S for a cell is met if the measured signal level of the cell is above a respective threshold.

27. An apparatus for cell selection accounting for Clear Channel Assessment, CCA, requirements, comprising a processor and a memory, said memory containing instructions executable by said processor whereby said apparatus is operative to:
determine a measurement period in a serving cell for the cell selection or cell re-selection (T1), wherein the measurement period is determined based on a number of consecutive Discontinuous Reception, DRX, cycles;
determining the cell selection time (T1) is used if CCA is in use, the cell selection time (T1) being extended relative to a duration used where CCA is not in use, determining the cell selection time (T1) being based on one or more of: CCA parameters; Channel Occupancy Time, COT, parameters; and Discovery Reference Signal, DRS, properties;
determine a number of measurement occasions configured with a DRS in the cell during T1, the measurement during the cell selection time (T1) taking into account one or more of:
a time required to evaluate whether a newly detectable cell meets selection criteria being a function of, or proportional to, a number of DRS occasions necessary to detect the presence of DRS and a number of configured DRS occasions in the target cell not available;
a time required to evaluate that a cell that has already been detected but not selected has met the selection criteria being a function of, or proportional to, a number of DRS occasions necessary to detect the presence of DRS, a number of samples necessary to perform a measurement and evaluate based on the detected DRS and a number of configured DRS occasions in the target cell not available; and
a measurement periodicity of already identified cells;
determine availability of the DRS at the measurement occasions; and
perform measurement based on the availability of the DRS at the measurement occasions during T1; and
determine whether to perform the cell selection or the cell re-selection based on the measurement during cell selection time (T1).

* * * * *